US012785271B2

(12) United States Patent
Fan et al.

(10) Patent No.: US 12,785,271 B2
(45) Date of Patent: Nov. 3, 2026

(54) METASURFACE UNIT AND METASURFACE UNIT DESIGN METHOD

(71) Applicant: HUAWEI TECHNOLOGIES CO., LTD., Shenzhen (CN)

(72) Inventors: Lei Fan, Shenzhen (CN); Hua Cai, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 18/526,266

(22) Filed: Dec. 1, 2023

(65) Prior Publication Data

US 2024/0097334 A1 Mar. 21, 2024

Related U.S. Application Data

(63) Continuation of application No. PCT/CN2022/095774, filed on May 27, 2022.

(30) Foreign Application Priority Data

Jun. 4, 2021 (CN) ......................... 202110624645.2

(51) Int. Cl.
*H01Q 3/46* (2006.01)
*H01Q 9/16* (2006.01)
(Continued)

(52) U.S. Cl.
CPC ............. *H01Q 3/46* (2013.01); *H01Q 15/002* (2013.01); *H01Q 15/0026* (2013.01);
(Continued)

(58) Field of Classification Search
CPC ............ H01Q 3/46; H01Q 9/16; H01Q 9/285; H01Q 15/002; H01Q 15/0026; H01Q 15/0086
See application file for complete search history.

(56) References Cited

U.S. PATENT DOCUMENTS 6,396,449 B1 * 5/2002 Osterhues ............ H01Q 15/002 343/756
9,780,434 B1 * 10/2017 Weller ................... H01Q 9/065
(Continued)

FOREIGN PATENT DOCUMENTS

CN 107799891 A 3/2018
CN 109888488 A 6/2019
(Continued)

OTHER PUBLICATIONS

International Search Report issued in corresponding International Application No. PCT/CN2022/095774, dated Aug. 26, 2022, pp. 1-10.

*Primary Examiner* — Amal Patel
(74) *Attorney, Agent, or Firm* — HAUPTMAN HAM, LLP

(57) ABSTRACT

A metasurface unit includes a first metal layer, a first dielectric layer, a second metal layer, a second dielectric layer, and a third metal layer. The first metal layer includes a first dipole arm pair and a second dipole arm pair, the first dipole arm pair is disposed in a first direction, and the second dipole arm pair is disposed in a second direction perpendicular to the first direction. The second metal layer includes at least one of the following: metal unit structures arranged at an equal distance in a third direction, metal unit structures arranged at an equal distance in a fourth direction perpendicular to the third direction, and metal unit structures arranged at an equal distance in the third direction and the fourth direction. The third direction and the first direction or the second direction are parallel or have a first included angle.

20 Claims, 16 Drawing Sheets

103

(51) Int. Cl.
*H01Q 9/28* (2006.01)
*H01Q 15/00* (2006.01)

(52) U.S. Cl.
CPC ........... *H01Q 15/0086* (2013.01); *H01Q 9/16* (2013.01); *H01Q 9/285* (2013.01)

(56) References Cited

U.S. PATENT DOCUMENTS

| | | | | |
|---|---|---|---|---|
| 11,239,555 | B2 * | 2/2022 | Behdad | H01Q 3/46 |
| 2017/0179596 | A1 * | 6/2017 | Diaz | H01Q 3/34 |

FOREIGN PATENT DOCUMENTS

| | | | |
|---|---|---|---|
| CN | 110518338 | A | 11/2019 |
| CN | 110880645 | A | 3/2020 |
| GB | 2258949 | A | 2/1993 |

* cited by examiner (a) Grid bar structure (b) Fishbone structure (c) Resonant slot ring structure (d) Grid bar structure

METASURFACE UNIT AND METASURFACE UNIT DESIGN METHOD

CROSS-REFERENCE TO RELATED APPLICATIONS

This application is a continuation of International Application No. PCT/CN2022/095774, filed on May 27, 2022, which claims priority to Chinese Patent Application No. 202110624645.2, filed on Jun. 4, 2021. The disclosures of the aforementioned applications are hereby incorporated by reference in their entireties.

TECHNICAL FIELD

This application relates to the communication field, and in particular, to a metasurface unit and a metasurface unit design method.

BACKGROUND

To improve a network capacity and a rate, a millimeter-wave band is usually used. However, transmission and diffraction capabilities of an electromagnetic wave on the band are limited, and a large quantity of obstacles cause blocking in the environment. For example, an reconfiguration intelligent surfaces (reconfiguration intelligent surfaces, RIS) (which may also be referred to as a metasurface) may be deployed to perform dynamic beam control, to bypass an obstacle and implement dynamic network coverage. Specifically, the intelligent reflecting surface includes a large quantity of passive reflecting surface units (which may also be referred to as metasurface units) that are periodically arranged or aperiodically arranged on a two-dimensional plane. A reflected electromagnetic wave characteristic of each unit may be regulated by using a RIS controller, to actively control each unit to passively reflect an electromagnetic wave. Dynamic network coverage is implemented through combination of reflection of all units.

An existing reflecting surface unit has a defect when controlling a reflected electromagnetic wave characteristic (for example, a phase, an amplitude, a frequency, and a polarization manner). The phase is used as an example. A reflection phase of an incident electromagnetic wave of the reflecting surface unit has a relatively strong nonlinearity, and it is difficult to ensure a stable reflection phase difference within a relatively large band range. Consequently, a bandwidth of the reflecting unit is relatively narrow, and this is not conducive to coverage enhancement of a radio channel.

SUMMARY

Embodiments of this application provide a metasurface unit and a metasurface unit design method, to resolve a problem that a linearity of a reflection phase is relatively poor, and improve the linearity of the reflection phase.

To achieve the foregoing objective, this application uses the following technical solutions.

According to a first aspect, a metasurface unit is provided. The metasurface unit includes a first metal layer, a first dielectric layer, a second metal layer, a second dielectric layer, and a third metal layer. The first metal layer includes a first dipole arm pair and a second dipole arm pair, the first dipole arm pair is disposed in a first direction, and the second dipole arm pair is disposed in a second direction perpendicular to the first direction. The second metal layer includes at least one of the following: metal unit structures arranged at an equal distance in a third direction, metal unit structures arranged at an equal distance in a fourth direction perpendicular to the third direction, and metal unit structures arranged at an equal distance in the third direction and the fourth direction. The third direction and the first direction or the second direction are parallel or have a first included angle.

The metasurface unit provided in this application includes the first metal layer, the second metal layer, and the third metal layer. The first metal layer receives an electromagnetic wave, and the electromagnetic wave is reflected under a coupling action of the second metal layer and the third metal layer. A disposing direction of a metal structural unit in the second metal layer is related to a disposing direction of a dipole arm in the first metal layer, so that a polarization direction of the second metal layer and a polarization direction of the first metal layer are the same or approximately the same or have the first included angle. This can implement co-polarized electromagnetic wave reflection. The metal structural unit is a structure that shows different frequency characteristics in an orthogonal polarization direction. In this case, the metasurface unit provided in this application is a co-polarized metasurface unit. Further, based on the first dipole arm pair and the second dipole arm pair that are disposed perpendicular to each other, a linearity of a co-polarization reflection phase of the metasurface can be significantly improved, and a bandwidth can be widened.

In a possible design, the metasurface unit may further include a switch, the switch may include a first switch and a second switch, the first dipole arm pair may include a first dipole arm and a second dipole arm, and the second dipole arm pair may include a third dipole arm and a fourth dipole arm. The first dipole arm is connected to the second dipole arm through the first switch, and the third dipole arm is connected to the fourth dipole arm through the second switch. In this way, in two states “0” and “1”, after the metasurface unit is irradiated by an electromagnetic wave, a difference between phases of co-polarized reflected electromagnetic waves of the metasurface unit is 180 degrees, so that a 1-bit phase coding function can be implemented.

Optionally, the first switch and the second switch may be independent of each other, or the first switch and the second switch may be integrated into one component.

In a possible design, the first switch is disposed on a side that is of the first metal layer and that is away from the first dielectric layer. The metasurface unit may further include a third dielectric layer, the third dielectric layer is disposed on a side that is of the third metal layer and that is away from the second dielectric layer, and the second switch is disposed on a side that is of the third dielectric layer and that is away from the third metal layer. In this way, one switch is disposed at an upper layer of the metasurface unit, and the other switch is disposed at a bottom layer of the metasurface unit. Positions of the first switch and the second switch are not limited.

In a possible design, the metasurface unit may further include a switch, the switch may include a third switch, a fourth switch, a fifth switch, and a sixth switch, the first dipole arm pair may include a first dipole arm and a second dipole arm, and the second dipole arm pair may include a third dipole arm and a fourth dipole arm. The first dipole arm is connected to the third dipole arm through the third switch, and the first dipole arm is connected to the fourth dipole arm through the fourth switch. The second dipole arm may be connected to the third dipole arm through the fifth switch, and the second dipole arm may be connected to the fourth dipole arm through the sixth switch. In this way, a 2-bit phase coding function may be implemented by using four switches.

In a possible design, the switch may be disposed on a side that is of the first metal layer and that is away from the first dielectric layer.

In a possible design, some switches included in the switch are disposed on a side that is of the first metal layer and that is away from the first dielectric layer, and the other switches included in the switch are disposed on a side that is of the third dielectric layer and that is away from the third metal layer.

In a possible design, the metasurface unit may further include a third dielectric layer, the third dielectric layer is disposed on a side that is of the third metal layer and that is away from the second dielectric layer, and the switch is disposed on a side that is of the third dielectric layer and that is away from the third metal layer.

In a possible design, the first included angle may be greater than or equal to −K° and less than or equal to +K°, and K is greater than 0 and less than 30. In this way, two polarization directions of the metal unit structure are respectively approximately parallel to polarization directions of the first dipole arm pair 106 and the second dipole arm pair 107, or an included angle is greater than or equal to −K° and less than or equal to +K°.

In a possible design, K is equal to 20. When K is equal to 20 degrees, in an ideal situation, a principal polarization reflection gain loss is 0.55 dB, and a scattering pattern XPD indicator is 8.77 dB, which are basically acceptable.

When the third direction P may be parallel to or approximately parallel to the first direction X or the second direction Y, or the first included angle is 0°, in an ideal situation, the principal polarization reflection gain loss is 0 dB, and the scattering pattern XPD indicator tends to be infinite. This is an optimal state.

In a possible design, the first dipole arm in the first dipole arm pair is connected to the third metal layer through a cascaded first radial stub, and the second dipole arm in the first dipole arm pair is electrically connected to a first feeder or the third metal layer through a second radial stub. The third dipole arm in the second dipole arm pair is connected to the third metal layer or a second feeder through a third radial stub, and the fourth dipole arm in the second dipole arm pair is connected to a third feeder through a fourth radial stub. In this way, a 1-bit or 2-bit phase coding function may be implemented.

In a possible design, there are J second metal layers, there are J second dielectric layers, J is an integer greater than or equal to 2, and the second metal layers and the second dielectric layers are alternately arranged. For example, a quantity of second metal layers and a quantity of second dielectric layers are greater than or equal to 2, and a plurality of metal structural units are connected in series to widen a bandwidth, so that effect the same as or better than that of a single second metal layer and a single second dielectric layer can be achieved.

In a possible design, the metal unit structure may include but is not limited to at least one of the following: a grid bar structure, a fishbone structure, and a resonant slot ring structure.

In a possible design, at least one side of a grid bar in the grid bar structure is flush with an edge of the second dielectric layer, or at least one side of a grid bar in the grid bar structure is spaced from an edge of the second dielectric layer.

In a possible design, the dipole arm may include but is not limited to at least one of the following: an arrow-shaped dipole arm, a strip-shaped dual-polarized dipole arm, an arc-shaped dual-polarized dipole arm, a folded dual-polarized dipole arm, or a grid-shaped dual-polarized dipole arm.

In a possible design, the first dielectric layer is a rectangle, and the first direction is parallel to any diagonal of the first dielectric layer.

In a possible design, the first dielectric layer is a rectangle, and the first direction is parallel to any edge of the first dielectric layer.

In other words, specific directions of the first direction and the second direction are not limited in this application, provided that the second direction is perpendicular to the first direction.

In a possible design, the switch may include but is not limited to at least one of the following: a double-pole double-throw (double pole double throw, DPDT) switch, a positive-intrinsic-negative PIN diode, a variable capacitance diode, a micro-electro-mechanical system (micro-electro-mechanical systems, MEMS) switch, and a photosensitive switch.

According to a second aspect, a metasurface is provided. The metasurface includes one or more metasurface units according to any one of the possible implementations of the first aspect.

In addition, for a technical effect of the metasurface in the second aspect, refer to the technical effect of the metasurface unit in the first aspect. Details are not described herein again.

According to a third aspect, a metasurface or metasurface unit design method is provided. The metasurface or metasurface unit design method includes: molding a first metal layer on a first dielectric layer, molding a second metal layer on a second dielectric layer, and molding a third metal layer on a side that is of the second dielectric layer and that is away from the second metal layer. The first metal layer includes a first dipole arm pair and a second dipole arm pair, the first dipole arm pair is disposed in a first direction, and the second dipole arm pair is disposed in a second direction perpendicular to the first direction. The second metal layer includes at least one of the following: metal unit structures arranged at an equal distance in a third direction, metal unit structures arranged at an equal distance in a fourth direction perpendicular to the third direction, and metal unit structures arranged at an equal distance in the third direction and the fourth direction. The third direction and the first direction or the second direction are parallel or have a first included angle.

In a possible design, the first dipole arm pair may include a first dipole arm and a second dipole arm, the second dipole arm pair may include a third dipole arm and a fourth dipole arm, and the metasurface or metasurface unit design method according to the third aspect may further include: connecting the first dipole arm to the second dipole arm through a first switch; and connecting the third dipole arm to the fourth dipole arm through a second switch.

In a possible design, the metasurface or metasurface unit design method according to the third aspect may further include: molding the first switch on a side that is of the first metal layer and that is away from the first dielectric layer; molding a third dielectric layer on a side that is of the third metal layer and that is away from the second dielectric layer; and molding the second switch on a side that is of the third dielectric layer and that is away from the third metal layer.

In a possible design, the first dipole arm pair may include a first dipole arm and a second dipole arm, the second dipole arm pair may include a third dipole arm and a fourth dipole arm, and the metasurface or metasurface unit design method according to the third aspect may further include: connecting the first dipole arm to the third dipole arm through a third switch; connecting the first dipole arm to the fourth dipole arm through a fourth switch; connecting the second dipole arm to the third dipole arm through a fifth switch; and connecting the second dipole arm to the fourth dipole arm through a sixth switch.

In a possible design, a switch may include the first switch and the second switch, or the switch may include the third switch, the fourth switch, the fifth switch, and the sixth switch, and the metasurface or metasurface unit design method according to the third aspect may further include: molding the switch on a side that is of the first metal layer and that is away from the first dielectric layer.

In a possible design, a switch may include the first switch and the second switch, or the switch may include the third switch, the fourth switch, the fifth switch, and the sixth switch, and the metasurface or metasurface unit design method according to the third aspect may further include: molding a third dielectric layer on a side that is of the third metal layer and that is away from the second dielectric layer; and molding the switch on a side that is of the third dielectric layer and that is away from the third metal layer.

In a possible design, the first included angle may be greater than or equal to −K° and less than or equal to +K°, and K is greater than 0 and less than 30.

In a possible design, K is equal to 20.

In a possible design, the metasurface or metasurface unit design method according to the third aspect may further include: connecting the first dipole arm in the first dipole arm pair to the third metal layer through a first radial stub, and connecting the second dipole arm in the first dipole arm pair to a first feeder or the third metal layer through a second radial stub; and connecting the third dipole arm in the second dipole arm pair to the third metal layer or a second feeder through a third radial stub, and connecting the fourth dipole arm in the second dipole arm pair to a third feeder through a fourth radial stub.

In a possible design, there are J second metal layers, there are J second dielectric layers, J is an integer greater than or equal to 2, and the metasurface or metasurface unit design method according to the third aspect may further include: alternately molding the second metal layers and the second dielectric layers.

In a possible design, the metal unit structure may include but is not limited to at least one of the following: a grid bar structure, a fishbone structure, and a resonant slot ring structure.

In a possible design, at least one side of a grid bar in the grid bar structure is flush with an edge of the second dielectric layer, or at least one side of a grid bar in the grid bar structure is spaced from an edge of the second dielectric layer.

In a possible design, the dipole arm includes but is not limited to at least one of the following: an arrow-shaped dipole arm, a strip-shaped dual-polarized dipole arm, an arc-shaped dual-polarized dipole arm, a folded dual-polarized dipole arm, and a grid-shaped dual-polarized dipole arm.

In a possible design, the first dielectric layer is a rectangle, and the first direction overlaps any diagonal of the first dielectric layer.

In a possible design, the first dielectric layer is a rectangle, and the first direction is parallel to any edge of the first dielectric layer.

In a possible design, the switch includes but is not limited to at least one of the following: a DPDT switch, a PIN diode, a variable capacitance diode, an MEMS switch, and a photosensitive switch.

In addition, for a technical effect of the metasurface design method in the third aspect, refer to the technical effect of the metasurface unit in the first aspect. Details are not described herein again.

DESCRIPTION OF EMBODIMENTS

Figure 1:
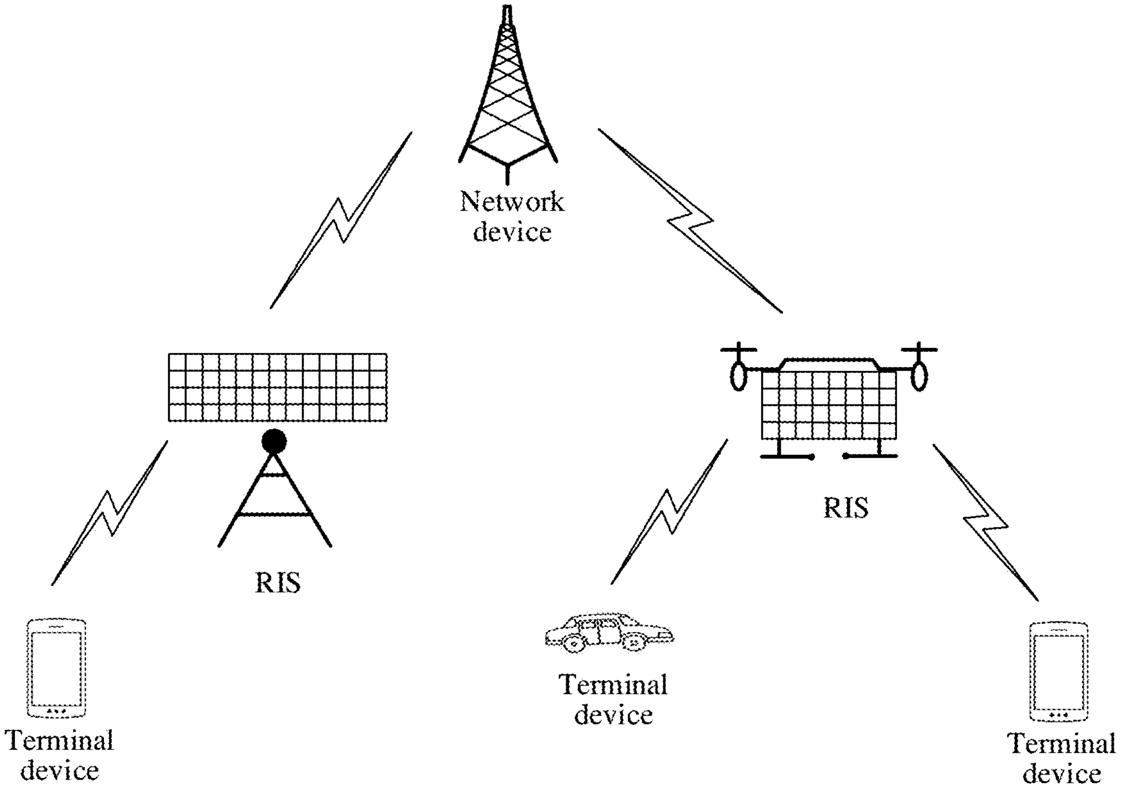
FIG. 1 is a schematic diagram of an architecture of a communication system according to at least one embodiment of this application.

The following describes technical solutions of this application with reference to accompanying drawings.

The technical solutions in embodiments of this application may be applied to various communication systems, for example, a wireless fidelity (wireless fidelity, Wi-Fi) system, a vehicle-to-everything (vehicle to everything, V2X) communication system, a device-to-device (device-to-device, D2D) communication system, a machine-to-machine (machine to machine, M2M) communication system, a satellite communication system, an internet of vehicles communication system, a 4th generation (4th generation, 4G) mobile communication system such as a long term evolution (long term evolution, LTE) system or a worldwide interoperability for microwave access (worldwide interoperability for microwave access, WiMAX) communication system, a 5th generation (5th generation, 5G) mobile communication system such as a new radio (new radio, NR) system, and a future communication system such as a 6th generation (6th generation, 6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application, a subscript, for example, $W_1$, may sometimes be incorrectly written in a non-subscript form, for example, W1. Expressed meanings are consistent when differences are not emphasized.

The following terms "first", "second", and the like are merely used for description, but should not be understood as indicating or implying relative importance or implying a quantity of indicated technical features. Therefore, a feature limited by "first", "second", or the like may explicitly or implicitly include one or more features. In the descriptions of this application, unless otherwise stated, "a plurality of" means two or more.

In addition, in this application, position terms such as "top" and "bottom" are defined relative to positions of components in the accompanying drawings. It should be understood that these position terms are relative concepts used for relative description and clarification, and may correspondingly change based on changes in the positions of the components in the accompanying drawings.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

For ease of understanding of embodiments of this application, a communication system shown in FIG. 1 is used as an example to first describe in detail a communication system applicable to embodiments of this application. For example, FIG. 1 is a schematic diagram of an architecture of a communication system to which a metasurface unit and a metasurface unit design method are applicable according to at least one embodiment of this application.

As shown in FIG. 1, the communication system includes a RIS. Optionally, the communication system may further include a network device and a terminal device. There may be one or more RISs, there may be one or more terminal devices, and one RIS can communicate with one or more terminal devices. The RIS may be fixed, or the RIS may be movable.

The RIS is a device that accesses the communication system and can communicate with the terminal device. The network device and one or more RIS arrays may jointly provide a service for the terminal device. The RIS may be deployed in a wireless communication network in a form of hardware. The RIS may be deployed in a centralized manner, a distributed manner, or a static manner, or deployed on a mobile carrier (for example, an uncrewed aerial vehicle). The RIS includes a plurality of units, and RISs operating on different bands (sub 10 GHZ, MMW, THz, and the like) correspond to different quantities of array units or different array areas. For example, a RIS operating at 10.5 GHz includes more than 10,000 units. The RIS can intelligently reflect an electromagnetic wave passively without coding and modulation measures, and can implement an intelligent connection between a base station end and a terminal device or between a Wi-Fi end and a terminal device.

It should be noted that the RIS may also be referred to as a coded metasurface, a dynamic metasurface, a metasurface, or the like. In embodiments of this application, the metasurface is used as an example for description.

The network device is a device that is located on a network side of the communication system and has wireless sending and receiving functions, or a chip or a chip system that can be disposed in the device. The network device includes but is not limited to: an access point (access point, AP) such as a home gateway, a router, a server, a switch, or a bridge, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a radio relay node, a radio backhaul node, or a transmission and reception point (transmission and reception point, TRP, or transmission point, TP) in a wireless fidelity (wireless fidelity, Wi-Fi) system; a gNB or a transmission point (TRP or TP) in a 5G system such as a new radio (new radio, NR) system; one antenna panel or a group of antenna panels (including a plurality of antenna panels) of a base station in a 5G system; or a network node, such as a baseband unit (BBU), a distributed unit (distributed unit, DU), or a road side unit (road side unit, RSU) having a base station function, that forms a gNB or a transmission point.

The terminal device is a terminal accessing the communication system and having wireless sending and receiving functions, or a chip or a chip system that can be disposed in the terminal. The terminal device may also be referred to as user equipment (User Equipment, UE), a user apparatus, an access terminal, a subscriber unit, a subscriber station, a mobile station (mobile station, MS), a remote station, a remote terminal, a mobile device, a user terminal, a terminal, a terminal unit, a terminal station, a terminal apparatus, a wireless communication device, a user agent, or a user apparatus.

For example, the terminal device in embodiments of this application may be a mobile phone (mobile phone), a wireless data card, a personal digital assistant (personal digital assistant, PDA) computer, a laptop computer (laptop computer), a tablet computer (Pad), a computer with wireless sending and receiving functions, a machine type communication (machine type communication, MTC) terminal, a virtual reality (virtual reality, VR) terminal device, an augmented reality (augmented reality, AR) terminal device, an internet of things (internet of things, IoT) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal (for example, a game console, a smart television, a smart speaker, a smart refrigerator, and a fitness apparatus) in a smart home (smart home), a vehicle-mounted terminal, or an RSU having a terminal function. The access terminal may be a cellular phone (cellular phone), a cordless phone, a session initiation protocol (session initiation protocol, SIP) phone, a wireless local loop (wireless local loop, WLL) station, a personal digital assistant (personal digital assistant, PDA), a handheld device (handset) having a wireless communication function, a computing device, another processing device connected to a wireless modem, a wearable device, or the like.

For another example, the terminal device in embodiments of this application may be an express delivery terminal in smart logistics (for example, a device that can monitor a location of a goods vehicle or a device that can monitor a temperature and humidity of goods), a wireless terminal in smart agriculture (for example, a wearable device that can collect data related to livestock), a wireless terminal in a smart building (for example, a smart elevator, a fire monitoring device, and a smart meter), a wireless terminal in smart healthcare (for example, a wearable devices that can monitor a physiological state of a person or an animal), a wireless terminal in smart transportation (for example, a smart bus, a smart vehicle, a shared bicycle, a charging pile monitoring device, smart traffic lights, a smart monitor, and a smart parking device), or a wireless terminal in smart retail (for example, a vending machine, a self-checkout machine, and an unmanned convenience store). For another example, the terminal device in this application may be a vehicle-mounted module, a vehicle-mounted component, a vehicle-mounted chip, or a vehicle-mounted unit that is built in a vehicle as one or more components or units. The vehicle may implement the method in this application by using the built-in vehicle-mounted module, vehicle-mounted component, vehicle-mounted chip, or vehicle-mounted unit.

It should be noted that the solutions in embodiments of this application may also be applied to another communication system, and a corresponding name may also be replaced with a name of a corresponding function in the another communication system.

It should be understood that FIG. 1 is merely a simplified schematic diagram of an example for ease of understanding. The communication system may further include another network device and/or another terminal device that are/is not shown in FIG. 1.

To make embodiments of this application clearer, the following uniformly describes some content and concepts related to embodiments of this application.

Metasurface: The metasurface is a two-dimensional artificial electromagnetic material (or referred to as a digital coding metamaterial) that is formed by periodically or aperiodically arranging sub-wavelength structural units on a two-dimensional plane and that has an electromagnetic wave regulation capability, and can regulate characteristics such as polarization, an amplitude, a phase, and a transmission mode of an electromagnetic wave.

Coded metasurface: An electromagnetic wave response on a plane is regulated by using a digital coding sequence. The coded metasurface may also be referred to as a dynamic metasurface, an intelligent reflecting surface, or the like.

Polarization twist: For comparison between an electric field direction of a reflected electromagnetic wave and an electric field direction of an incident electromagnetic wave, an electric field polarization direction deflects by a specific angle.

Co-polarization reflection: After reflection by a reflecting surface, a reflected electromagnetic wave has a same electric field polarization direction as an incident electromagnetic wave.

Cross polarization reflection: After reflection by a reflecting surface, an electric field polarization direction of a reflected electromagnetic wave is orthogonal to that of an incident electromagnetic wave.

Dynamic metasurfaces may be classified into a regulable metasurface and a reconfigurable metasurface. The metasurface can be regulated in real time under the effect of an external control signal, to implement a dynamic electromagnetic wave regulation capability.

The digital coding metamaterial integrates digital coding representation and a field programmable gate array (field programmable gate array, FPGA) into a dynamic metasurface design, an electromagnetic parameter is represented by using a digital state, and switching of an electromagnetic wave regulation function may be implemented according to a compiled control program and a specified digital coding sequence.

For example, a response of a metasurface unit to an electromagnetic wave in one cycle is divided at an equal interval, and quantized in a form of bit. For example, electromagnetic wave reflection phases "0°" and "180°" are defined as "0" and "1" respectively, to form 1-bit phase quantization. Similarly, electromagnetic wave reflection phases "0°", "90°", "180°", and "270°" are defined as "00", "01", "10", and "11" respectively, to form 2-bit phase quantization. Similarly, another characteristic (for example, an amplitude) of an electromagnetic wave may be quantized, and details are not described herein. The coded metasurface may implement specified electromagnetic beam regulation by pre-coding and sorting coding states of metasurface units and superimposing and combining reflection of the units on a two-dimensional plane.

The metasurface is a plane including a large quantity of low-cost and adjustable passive reflecting units, and is a wireless network technology that can intelligently reconstruct a radio channel between a network device and a terminal device. A main principle of the metasurface is to introduce a coded metasurface unit that can freely control a reflected electromagnetic wave characteristic (for example, a phase, an amplitude, a frequency, and a polarization manner) into a reflecting surface without complex coding and radio frequency processing, to intelligently reconstruct a radio channel environment between transceivers, implement coverage enhancement, improve energy efficiency, and implement low-cost and large-scale connections.

Figure 2:
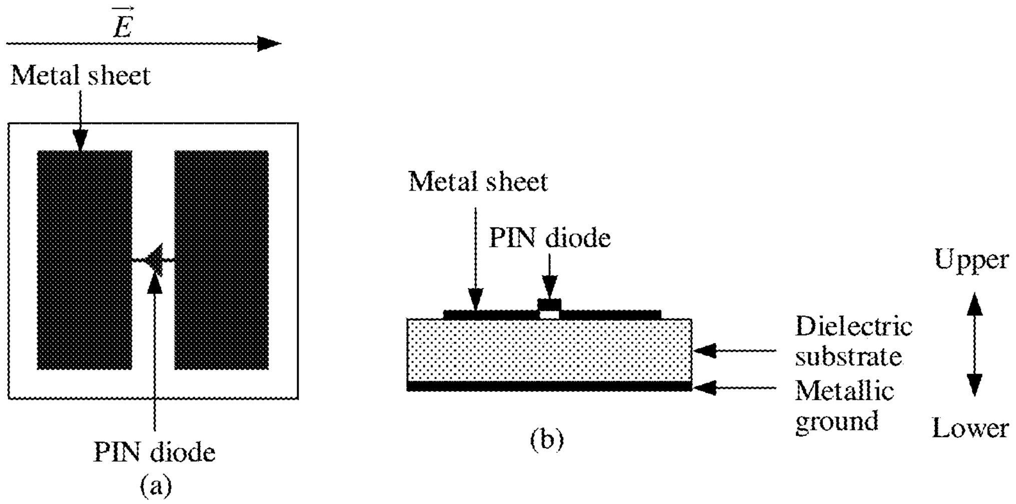
FIG. 2 is a schematic diagram of a structure of a co-polarized metasurface unit.

FIG. 2 shows a co-polarized metasurface unit. (a) in FIG. 2 is a top view of the metasurface unit, and (b) in FIG. 2 is a side view of the metasurface unit.

The co-polarized metasurface unit (which may also be referred to as a reflecting surface unit) mainly includes a patch, and a reflection phase of a patch unit is changed by regulating an equivalent size of the patch, exciting different modes of the patch, or the like.

As shown in (a) in FIG. 2 and (b) in FIG. 2, there are two rectangular metal sheets above a dielectric substrate, the two rectangular metal sheets are connected by using a PIN (positive-intrinsic-negative diode, PIN) diode, and a metallic ground is below the dielectric substrate. When an electric field polarization direction E of an electromagnetic wave is a horizontal direction, the reflection phase of the patch unit can be regulated by controlling a switch to be turned on (or switched on or connected) or turned off. When the switch is turned on (ON), a state is defined as “0”. When the switch is turned off (OFF), a state is defined as “1”.

It should be noted that the dielectric substrate may be a representation form of a dielectric layer.

Figure 3:
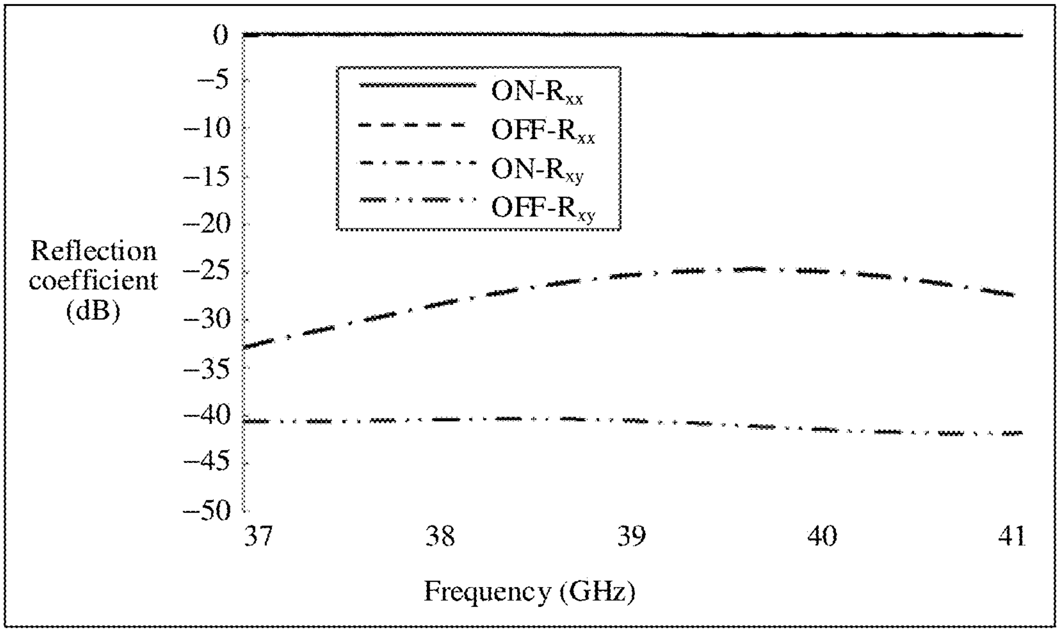
FIG. 3 is a simulation diagram of a reflection coefficient of a metasurface unit for an electromagnetic wave.
Figure 4:
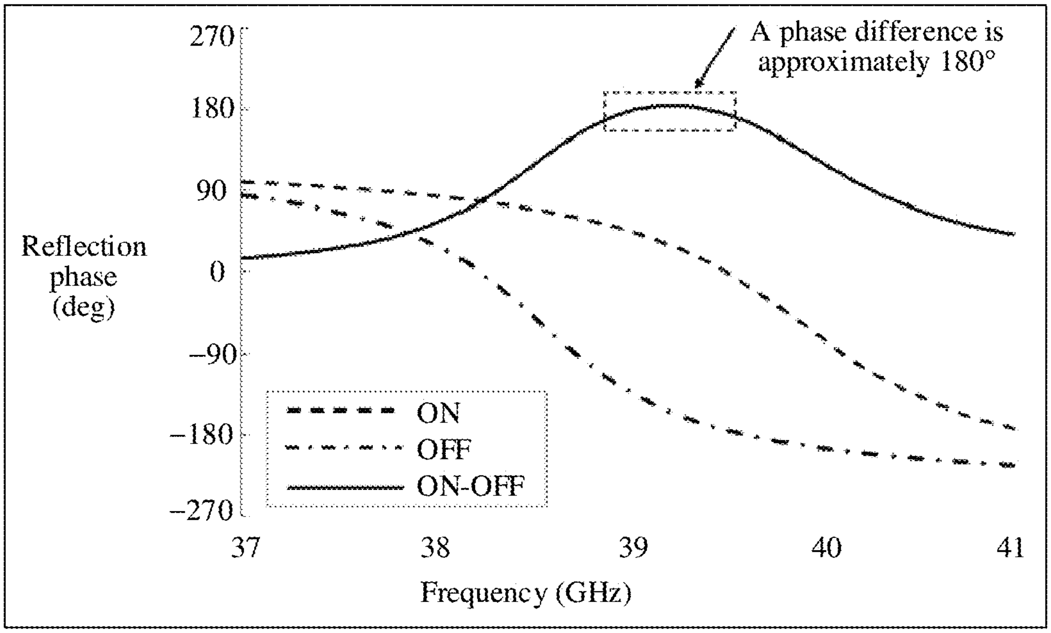
FIG. 4 is a simulation diagram of a reflection phase of a metasurface unit for an electromagnetic wave.

FIG. 3 is a simulation diagram of a reflection coefficient of the metasurface unit shown in FIG. 2 for an electromagnetic wave in a switch-on or switch-off state. FIG. 4 is a simulation diagram of a reflection phase of the metasurface unit shown in FIG. 2 for an electromagnetic wave in a switch-on or switch-off state.

As shown in FIG. 3, when the switch is in an ON state and an OFF state, a co-polarization reflection coefficient $R_{xx}$ (indicating x-polarization incident and x-polarization reflection) is close to 0 dB, that is, ON-$R_{xx}$ is close to 0 dB, and OFF-$R_{xx}$ is close to 0 dB; and a cross polarization reflection coefficient $R_{xy}$ is less than-20 dB, that is, ON-$R_{xy}$<−20 dB, and OFF-$R_{xy}$<−20 dB. $R_{xy}$ indicates x-polarization incident and x-polarization reflection. In this case, the metasurface unit shown in FIG. 2 performs co-polarization reflection, and reflection polarization purity is relatively high.

FIG. 4 shows a reflection phase when the switch is in an ON state, a reflection phase when the switch is in an OFF state, and a difference between the reflection phase when the switch is in the ON state and the reflection phase when the switch is in the OFF state. In the state “0” and the state “1”, due to a frequency characteristic of the patch unit, a difference occurs in the reflection phase. For a 1-bit coded metasurface unit, a phase difference between the two states is 180 degrees theoretically. However, in a simulation result shown in FIG. 4, the phase difference (ON-OFF) between the two states meets 180±20 degrees in only a narrow bandwidth.

In this case, a linearity of a reflection phase of the metasurface unit shown in FIG. 2 for an incident electromagnetic wave is poor. As a result, a bandwidth of this type of reflecting unit is relatively narrow, and for extension to 2-bit coding, the bandwidth is further narrowed. When a used frequency bandwidth is relatively wide, a phase difference of a side frequency between the two states “0” and “1” may seriously deviate from a phase of 180 degrees. As a result, a beam direction specified by the reflecting surface unit through beamforming and precoding deviates, and beams of different frequencies do not converge. This is not conducive to coverage enhancement of a radio channel.

Figure 5:
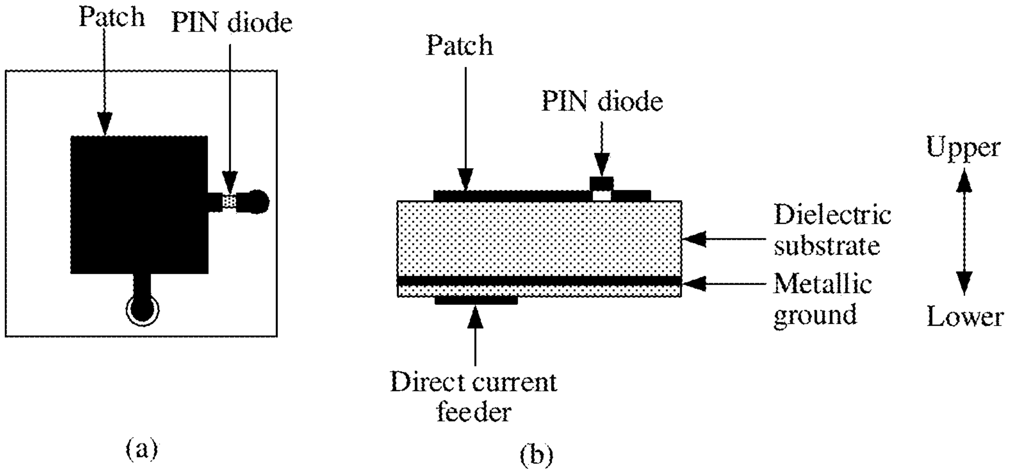
FIG. 5 is a schematic diagram of a structure of another co-polarized metasurface unit.

FIG. 5 shows another co-polarized metasurface unit.

As shown in FIG. 5, the metasurface unit includes a patch and a PIN diode. One end of the PIN diode is connected to a metallic ground, the other end of the PIN diode is connected to the patch, and the patch is connected to a direct current feeder. Whether a patch unit is grounded is controlled by using a switch, to excite different resonant modes, so as to change a reflection phase of the unit.

Figure 6:
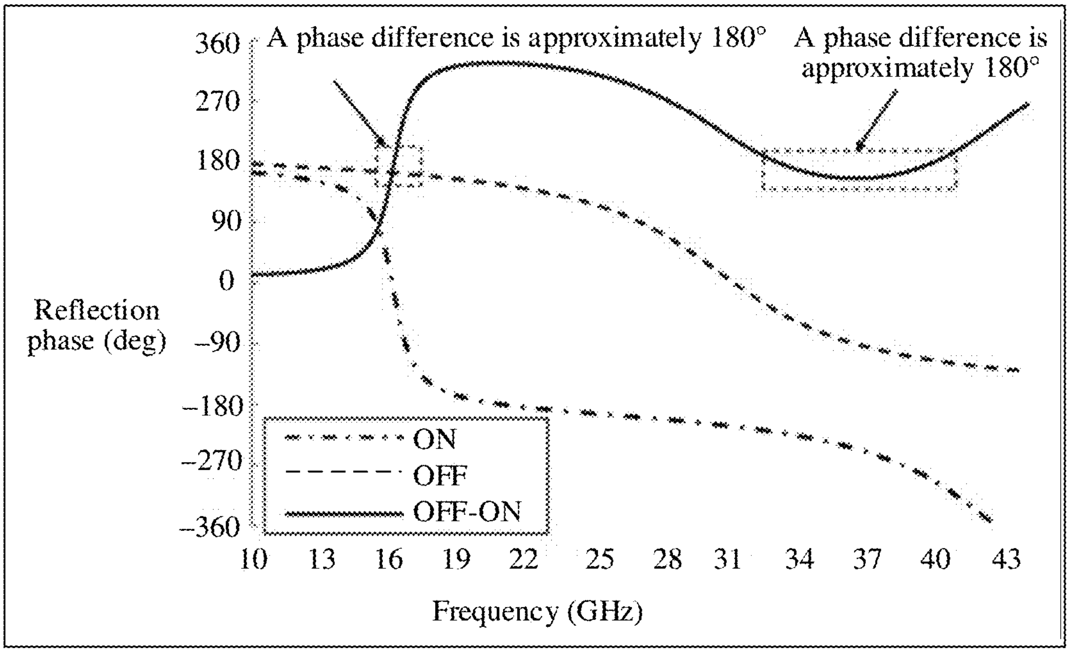
FIG. 6 is a simulation diagram of a reflection phase of a metasurface unit for an electromagnetic wave.

FIG. 6 is a simulation diagram of reflection phases of the metasurface unit shown in FIG. 5 for an electromagnetic wave in two states (on and off).

It can be learned from FIG. 6 that, a phase difference (ON-OFF) between the two states meets 180±20 degrees in only a narrow bandwidth, and a linearity of the reflection phase is still poor. As a result, a phase bandwidth is still narrow. For extension to 2-bit coding, the bandwidth is further narrowed.

It is learned through analysis that, the patch (patch)-based co-polarized reflecting surface unit shown in FIG. 2 and FIG. 5 has different tunings in different coding states, and a frequency response of the co-polarized reflecting surface unit determines that a reflection phase of the reflecting surface unit has a relatively strong nonlinearity. As a result, within a specific bandwidth range, reflection phases of units in a same coding state differ greatly at different frequencies. Consequently, after an incident wave is reflected by a coded metasurface, because phases at different frequencies differ greatly, a beam formed by reflecting the electromagnetic wave diverges. Therefore, a variable frequency electrical beam direction deviates by a preset angle, and this is not conducive to reflecting surface performance improvement, beam management, and the like.

Figure 7:
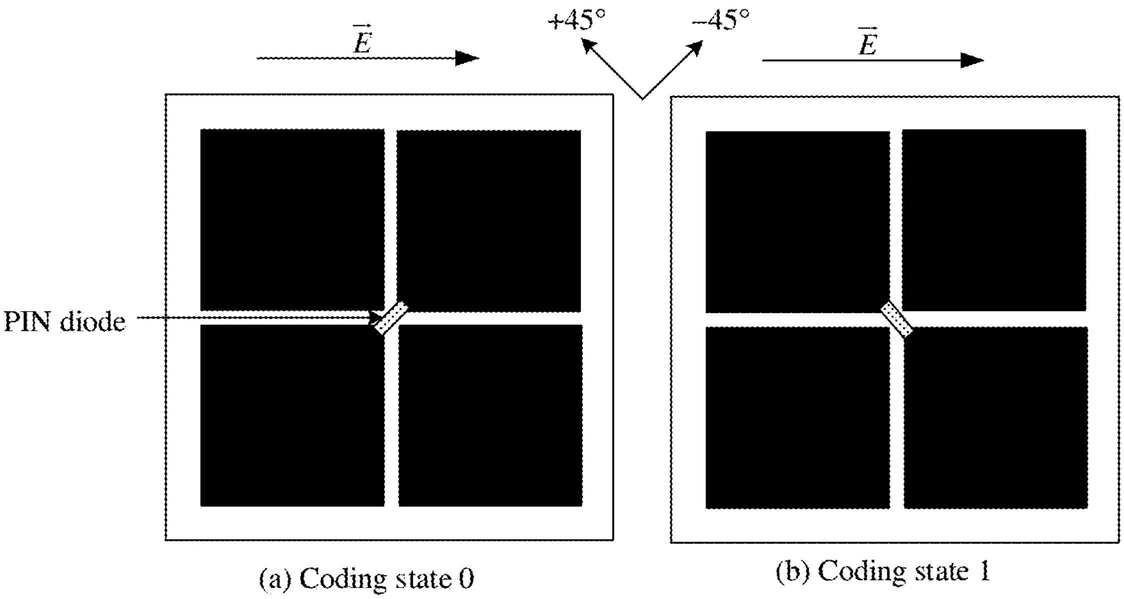
FIG. 7 is a schematic diagram of a structure of a metasurface unit.

FIG. 7 shows a metasurface unit.

The metasurface unit shown in FIG. 7 is a polarization twist unit based on a dual-polarized dipole. The metasurface unit may be an antenna resonance unit including two pairs of dipoles. Two dipoles on a diagonal may be referred to as a pair of dipoles. Two dipoles in each pair of dipoles are connected through a PIN diode. The metasurface unit includes a ±45° polarized grid-shaped dipole shown in FIG. 7. As shown in FIG. 7, a polarization direction $\overline{E}$ of an incident electromagnetic wave is a horizontal direction. For a 1-bit metasurface unit, when the −45° polarized dipole is turned on through a PIN diode and the +45° polarized dipole is turned off through a PIN diode (ON_OFF), a coding state is defined as “0”; and when the −45° polarized dipole is turned off through a PIN diode and the +45° polarized dipole is turned on through a PIN diode (OFF_ON), a coding state is defined as “1”.

For the metasurface unit shown in FIG. 7, when an electric field polarization direction $\overline{E}$ of an incident electromagnetic wave is a horizontal direction, reflected wave polarization of the metasurface unit twists by 90°, and the electric field polarization direction of the reflected electromagnetic wave is changed to vertical polarization.

Figure 8:
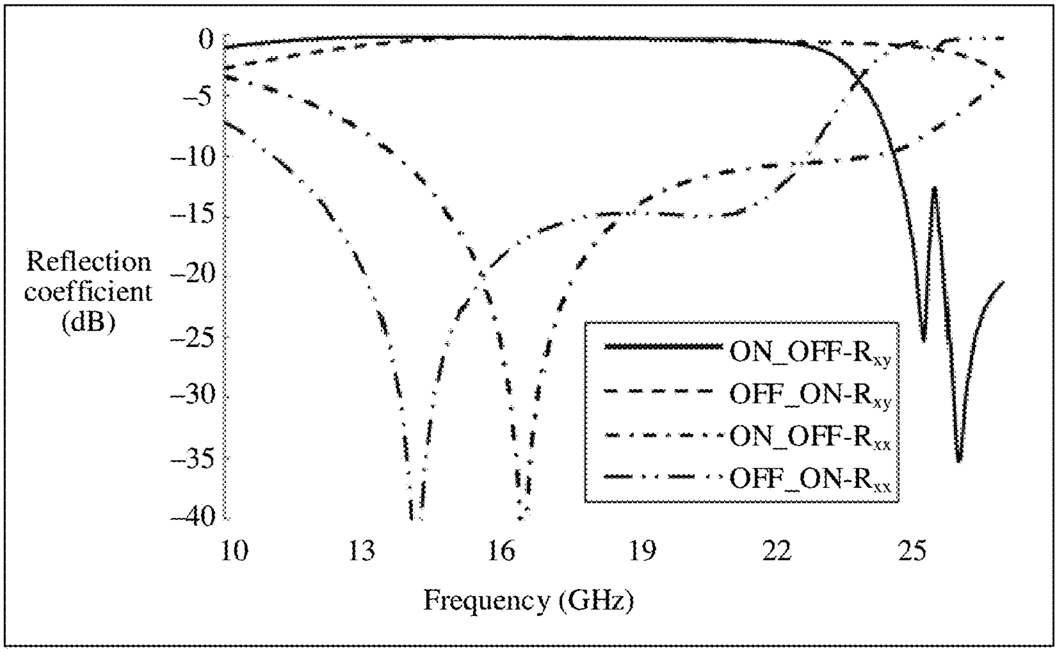
FIG. 8 is a simulation diagram of a reflection coefficient of a metasurface unit for an electromagnetic wave.
Figure 9:
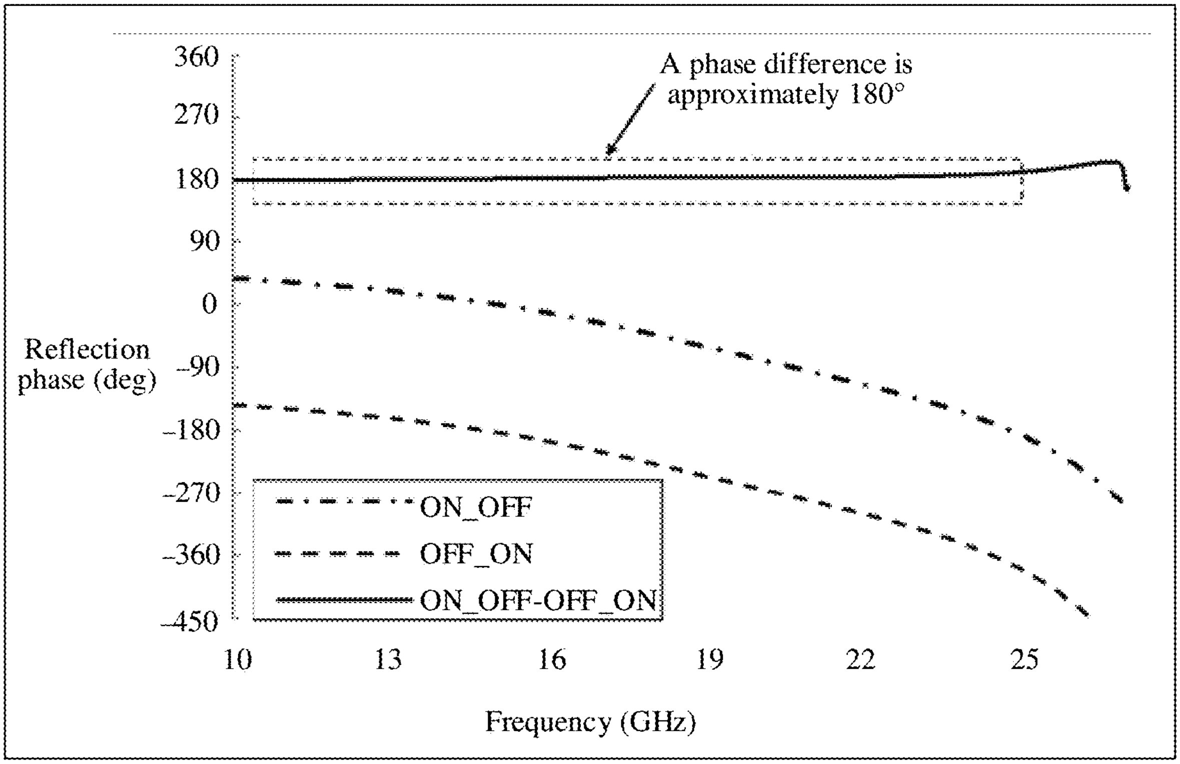
FIG. 9 is a simulation diagram of a reflection phase of a metasurface unit for an electromagnetic wave.

FIG. 8 is a simulation diagram of reflection coefficients of the metasurface unit shown in FIG. 7 for an electromagnetic wave in two states (state “O” and state “1”). FIG. 9 is a simulation diagram of reflection phases of the metasurface unit shown in FIG. 7 for an electromagnetic wave in two states.

As shown in a simulation result in FIG. 8, an orthogonal polarization reflection coefficient $R_{xy}$ is far greater than a co-polarization reflection coefficient $R_{xx}$ in the two states, and polarization of the reflected electromagnetic wave twists.

With reference to FIG. 9, electric field polarization of the reflected electromagnetic wave in the two states is vertical polarization, a phase difference is close to 180°, a phase bandwidth and a phase linearity are relatively wide, and the reflection phase linearity in the states "0" and "1" is well maintained in a wide band. This is significantly improved compared with the metasurface unit shown in FIG. 2 or FIG. 5.

It is found through analysis that, in one of the switch states, because equivalent boundaries of reflection of two polarized electromagnetic waves are different, as a polarization direction of an incident wave deflects, polarization of a reflected wave and polarization of the incident wave form an included angle, and the included angle changes with the incident polarization direction. The reflected polarization direction and the incident polarization direction may form any included angle.

Specifically, the included angle between the electric field polarization direction of the reflected electromagnetic wave and the electric field polarization direction of the incident electromagnetic wave is not always 90°. When electric field polarization of electromagnetic waves in different angle directions is incident to the metasurface unit, reflected electromagnetic wave polarization forming any angle with the electric field polarization direction of the incident electromagnetic wave may be generated, and an included angle between an incident vector and a reflected vector may change between 0° and 360°. In other words, the included angle between the polarization direction of the reflected electromagnetic wave and the polarization direction of the incident electromagnetic wave dynamically changes with the polarization direction of the incident electromagnetic wave, that is, the electric field polarization direction of the incident/reflected electromagnetic wave and the electric field polarization direction of the reflected electromagnetic wave encounter angle deflection, and a deflection angle is not fixed.

Further, when the metasurface unit shown in FIG. 7 is applied to a RIS, because reflected electric field polarization of the RIS deflects by 0° to 360°, and a parasitic structure environment (for example, a wall, a billboard, or a ceiling) thereof mainly involves co-polarized reflection, which is inconsistent with reflected polarization of the parasitic structure of the RIS with a high probability, it is difficult for reflection of the RIS and reflection of the environment to generate co-directional superimposition on a terminal, and a part of polarization energy is lost in a communication process of the RIS, resulting in a decrease in a signal-to-noise ratio, and a decrease in a communication capacity. In this case, the metasurface unit shown in FIG. 7 is not applicable to an intelligent reflecting surface.

For the dipole type-based polarization twist coded metasurface unit shown in FIG. 7, due to a wideband characteristic of a dipole, a stable phase difference between different coding states can be implemented through polarization twist in different the coding states. This is applicable to a phase requirement of a RIS. However, polarization of a reflected wave of the RIS deflects. Because the RIS is usually deployed on a plane structure like a wall, a billboard, or a ceiling, if reflected wave polarization of the RIS and reflected polarization of an environment are inconsistent or even orthogonal, an environment-reflected electromagnetic wave received by a terminal device and a RIS-reflected electromagnetic wave vector may be in different directions. This reduces signal utilization and a signal-to-noise ratio of the terminal device, and makes it difficult to improve a capacity.

In conclusion, a co-polarization reflection performance indicator phase bandwidth of the metasurface unit shown in FIG. 2 and FIG. 5 is insufficient. The dipole-based coded metasurface unit shown in FIG. 7 has slightly better performance in phase bandwidth, but an included angle between reflection polarization and incident polarization of the coded metasurface unit dynamically changes with an incident polarization direction. As a result, reflection polarization of the coded metasurface is inconsistent with a reflection polarization direction of the environment, and a probability of reducing a system capacity is relatively high.

It is found through analysis that, the RIS is usually a low-profile, light-weight, and conformal electromagnetic wave reflecting surface, and is easy to deploy on a wall, a billboard, a ceiling, or the like. Therefore, the reflection polarization of the RIS needs to be consistent with a parasitic structure (a wall, a billboard, a ceiling, or the like) of the RIS. In some working scenarios, when the RIS works, the reflection polarization of the environment needs to be consistent with the reflection polarization of the RIS, so that a probability of a good signal-to-noise ratio is higher.

Compared with those of the metasurface units shown in FIG. 2, FIG. 5, and FIG. 7, reflection phase linearities of the metasurface unit and the metasurface provided in embodiments of this application in different coding states are significantly improved. In a wide band, a co-polarized coded metasurface unit with a high phase linearity in different coding states is implemented, and reflection performance is excellent. In addition, the metasurface unit can implement co-polarized electromagnetic wave reflection, is applicable to an intelligent reflecting surface, may be applied to a reconfigurable reflecting array antenna, and may be applied to a co-polarized reflecting array, to extend a frequency and a phase bandwidth.

With reference to FIG. 10*a* to FIG. 28, the following specifically describes a metasurface unit, a metasurface, a metasurface unit design method, and a metasurface design method provided in embodiments of this application.

Figure 10A:
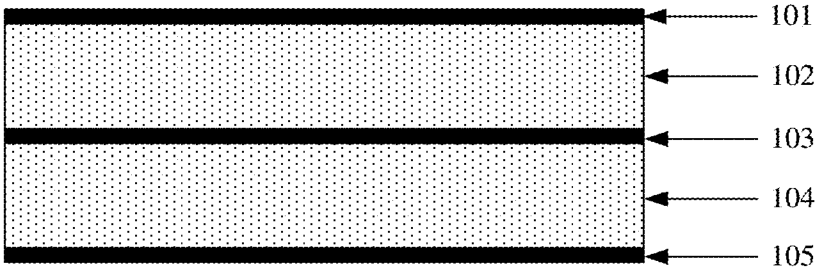
FIG. 10*a* is a side view of a metasurface unit according to at least one embodiment of this application.
Figure 10B:
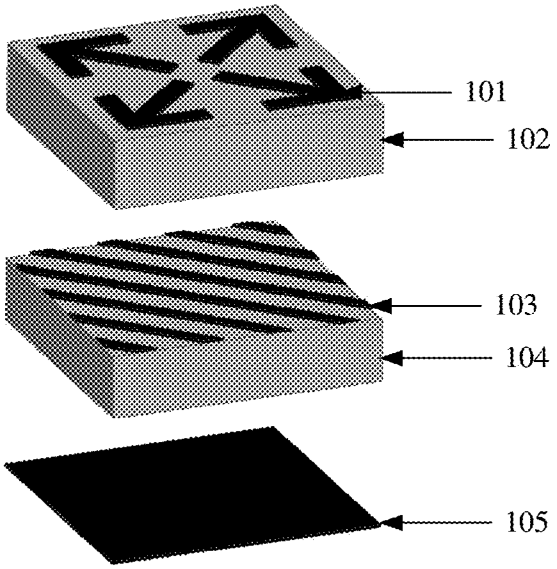
FIG. 10*b* is an exploded view of a metasurface unit according to at least one embodiment of this application.

FIG. 10*a* is a side view of a metasurface unit according to at least one embodiment of this application. FIG. 10*b* is an exploded view of a metasurface unit according to at least one embodiment of this application.

As shown in FIG. 10*a* or FIG. 10*b*, the metasurface unit includes a first metal layer 101, a first dielectric layer 102, a second metal layer 103, a second dielectric layer 104, and a third metal layer 105.

For example, the first metal layer 101, the first dielectric layer 102, the second metal layer 103, the second dielectric layer 104, and the third metal layer 105 may be sequentially disposed from top to bottom.

Figure 11A:
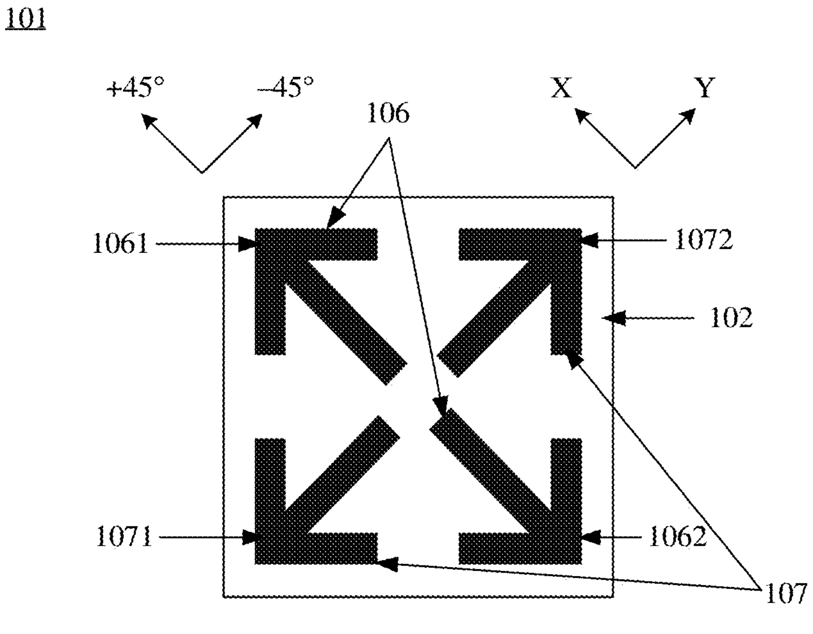
FIG. 11*a* is a top view of a first metal layer 101 according to at least one embodiment of this application.
Figure 11B:
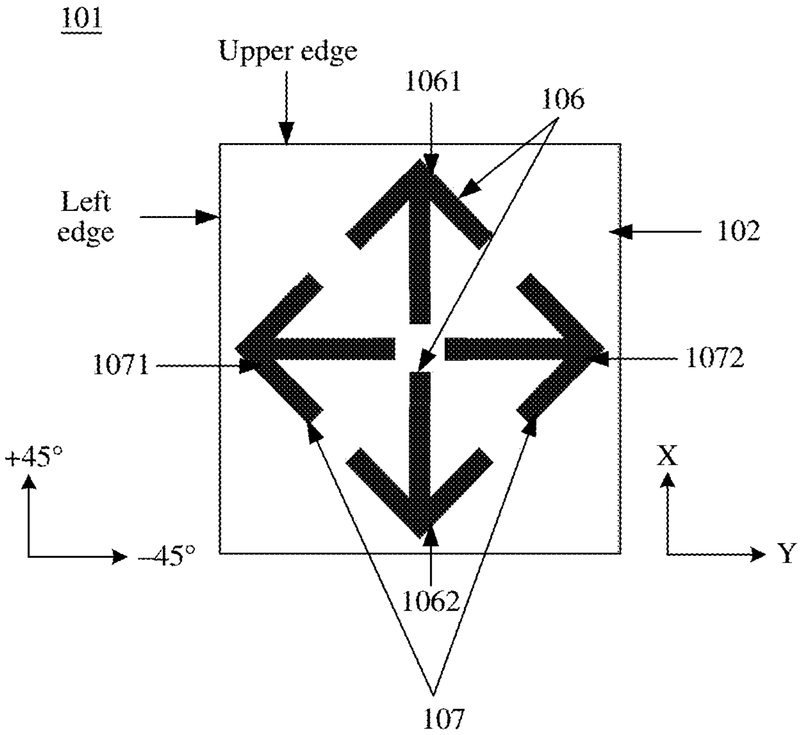
FIG. 11*b* is a top view of a first metal layer 101 according to at least one embodiment of this application.

FIG. 11*a* and FIG. 11*b* are top views of the first metal layer 101 according to at least one embodiment of this application.

As shown in FIG. 11*a* or FIG. 11*b*, the first metal layer 101 includes a first dipole arm pair 106 and a second dipole arm pair 107. The first dipole arm pair 106 includes a first dipole arm 1061 and a second dipole arm 1062. The second dipole arm pair 107 includes a third dipole arm 1071 and a fourth dipole arm 1072.

As shown in FIG. 11*a* or FIG. 11*b*, the first dipole arm pair 106 is disposed in a first direction X, and the second dipole arm pair 107 is disposed in a second direction Y that is perpendicular to the first direction X.

For example, the first metal layer 101 may receive an electromagnetic wave, and includes a reconfigurable dual-polarized dipole. With reference to FIG. 11*a* and FIG. 11*b*, a polarization direction of the first dipole arm pair 106 is defined as a +45° polarization direction, and a polarization direction of the second dipole arm pair 107 is defined as a −45° polarization direction, to form a wideband ±45° polarization unit dipole radiation surface.

For example, the second metal layer 103 includes at least one of the following: metal unit structures 1031 arranged at an equal distance in a third direction P, metal unit structures 1031 arranged at an equal distance in a fourth direction Q perpendicular to the third direction P, and metal unit structures 1031 arranged at an equal distance in the third direction P and the fourth direction Q.

The third direction P and the first direction X or the second direction Y may be parallel or have a first included angle. For example, the "parallel" may be "approximately parallel", and there may be a specific included angle, for example, 0.1°, 0.5°, or 1°.

In this way, a polarization direction of the metal unit structure 1031 and a polarization direction of the dipole arm pair included in the first metal layer 101 are the same or approximately the same or have the first included angle.

In some embodiments, the metal unit structure 1031 may include one or more of the following: a grid bar structure, a fishbone structure, and a resonant slot ring structure.

Optionally, the grid bar structure may be referred to as a metal grid bar structure, a periodic grid bar structure, a metal grid structure, a grid structure, a periodic grid structure, or the like. Similarly, the fishbone structure and the resonant slot ring structure may be replaced with other corresponding names. This is not limited in this application.

Figure 12A:
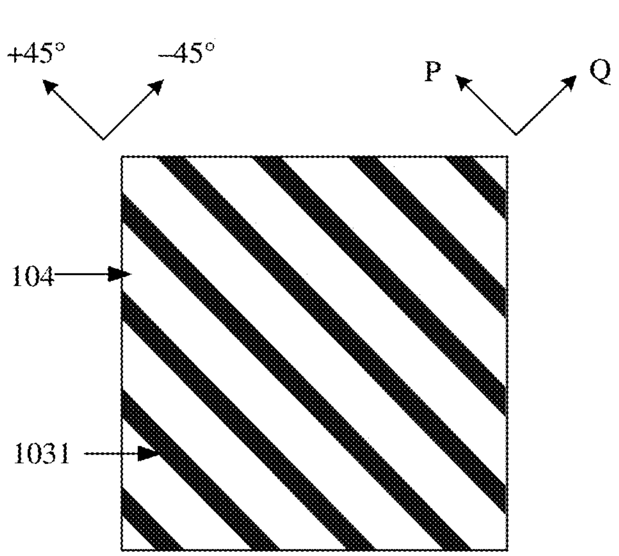
FIG. 12*a* is a top view of a second metal layer 103 according to at least one embodiment of this application.
Figure 12B:
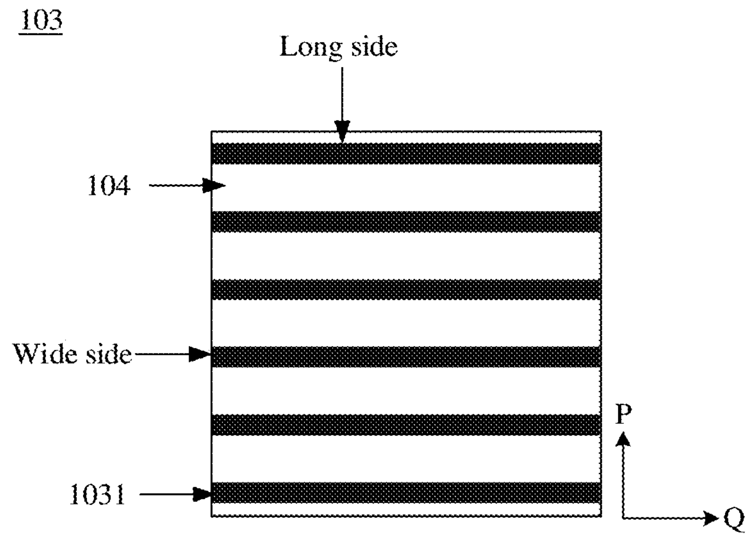
FIG. 12*b* is a top view of a second metal layer 103 according to at least one embodiment of this application.

FIG. 12*a* and FIG. 12*b* are top views of the second metal layer 103 according to at least one embodiment of this application.

FIG. 12*a* is described by using an example in which the metal unit structure 1031 is a grid bar structure, and the third direction P and the first direction X shown in FIG. 11*a* are parallel or have the first included angle. As shown in FIG. 12*a*, the second metal layer 103 includes metal unit structures 1031 arranged at an equal distance in the fourth direction Q perpendicular to the third direction P.

FIG. 12*b* is described by using an example in which the metal unit structure 1031 is a grid bar structure, and the third direction P and the first direction X shown in FIG. 11*b* are parallel or have the first included angle. As shown in FIG. 12*b*, the second metal layer 103 includes metal unit structures 1031 arranged at an equal distance in the third direction P.

It should be noted that, it is assumed that the grid bar in the grid bar structure shown in FIG. 12*b* is disposed horizontally. If the third direction P and the second direction Y shown in FIG. 11*b* are parallel or have the first included angle, the grid bar in the grid bar structure is disposed vertically.

For example, the metal unit structures 1031 are fishbone structures, and are arranged at an equal distance in the third direction P and the fourth direction Q. For details, refer to FIG. 14. Details are not described herein again.

A polarization direction of the second metal layer 103 shown in FIG. 12*a* and a polarization direction of the first metal layer 101 in FIG. 11*a* are the same or approximately the same or have the first included angle. A polarization direction of the second metal layer 103 shown in FIG. 12*b* and a polarization direction of the first metal layer 101 in FIG. 11*b* are the same or approximately the same or have the first included angle. For example, the polarization direction is a +45° polarization direction or a −45° polarization direction.

For example, the second metal layer 103 may regulate a reflected electromagnetic wave, and may control reflection polarization of the metasurface unit.

It should be noted that the second metal layer 103 may be referred to as a polarization rotation frequency selection surface.

For example, the second metal layer 103 has a frequency selection characteristic. For an incident electromagnetic wave, the grid bar may be equivalent to a perfect electric conductor (perfect electric conductor, PEC) in a direction of the metal grid bar (for example, the third direction P in FIG. 11*a* or the fourth direction Q in FIG. 12*b*) and the grid bar may be equivalent to a perfect magnetic conductor (perfect magnetic conductor, PMC) in a direction perpendicular to the grid bar (for example, the fourth direction Q in FIG. 11*a* or the third direction P in FIG. 12*b*). A polarization direction of each incident electromagnetic wave may be decomposed into an orthogonal direction of the grid bar, and vector decomposition and composition are performed. A reflection polarization vector equivalent to the PEC generates a 0-degree phase change, and a reflection polarization vector equivalent to the PMC generates a 180-degree phase change. Therefore, as the polarization direction changes, a composite polarization vector deflects, and a deflection angle of the composite polarization vector may be exactly opposite to a deflection angle of a dipole, to achieve angle complementary effect. In addition, the second metal layer 103 may be rotated by 90 degrees.

In some embodiments, the third metal layer 105 may be a metallic ground, and can reflect an electromagnetic wave.

For example, a size of the third metal layer 105 may be approximately consistent with a size of the second dielectric layer 104. When the metasurface includes a plurality of metasurface units, all the metasurface units may share a same large reflection ground.

The metasurface unit provided in at least one embodiment of this application includes the first metal layer, the second metal layer, and the third metal layer. The first metal layer receives an electromagnetic wave, and the electromagnetic wave is reflected under a coupling action of the second metal layer and the third metal layer. A disposing direction of a metal structural unit in the second metal layer is related to a disposing direction of a dipole arm in the first metal layer, so that the polarization direction of the second metal layer and the polarization direction of the first metal layer are the same or approximately the same or have the first included angle. This can significantly improve a linearity of a reflection phase, and widen a bandwidth.

In addition, the metasurface unit provided in at least one embodiment of this application is a co-polarized metasurface unit. Based on a dipole-type coded metasurface unit, the second metal layer is added. The second metal layer includes a metal structural unit with reflection polarization rotation, and the metal structural unit is a structure showing different frequency characteristics in an orthogonal polarization direction. When the metal structural unit is disposed between the first metal layer and the third metal layer, orthogonal polarization of the second metal layer is parallel to orthogonal polarization of a dipole, so that co-polarized electromagnetic wave reflection can be implemented. The metasurface unit is applicable to an intelligent reflecting surface, and may be applied to a reconfigurable reflecting array antenna, a co-polarized reflecting array, and the like.

In some embodiments, the dipole arm may include but is not limited to one or more of the following: an arrow-shaped dual-polarized dipole arm, a strip-shaped dual-polarized dipole arm, an arc-shaped dual-polarized dipole arm, a folded dual-polarized dipole arm, and a grid-shaped dual-polarized dipole arm.

Figure 13:
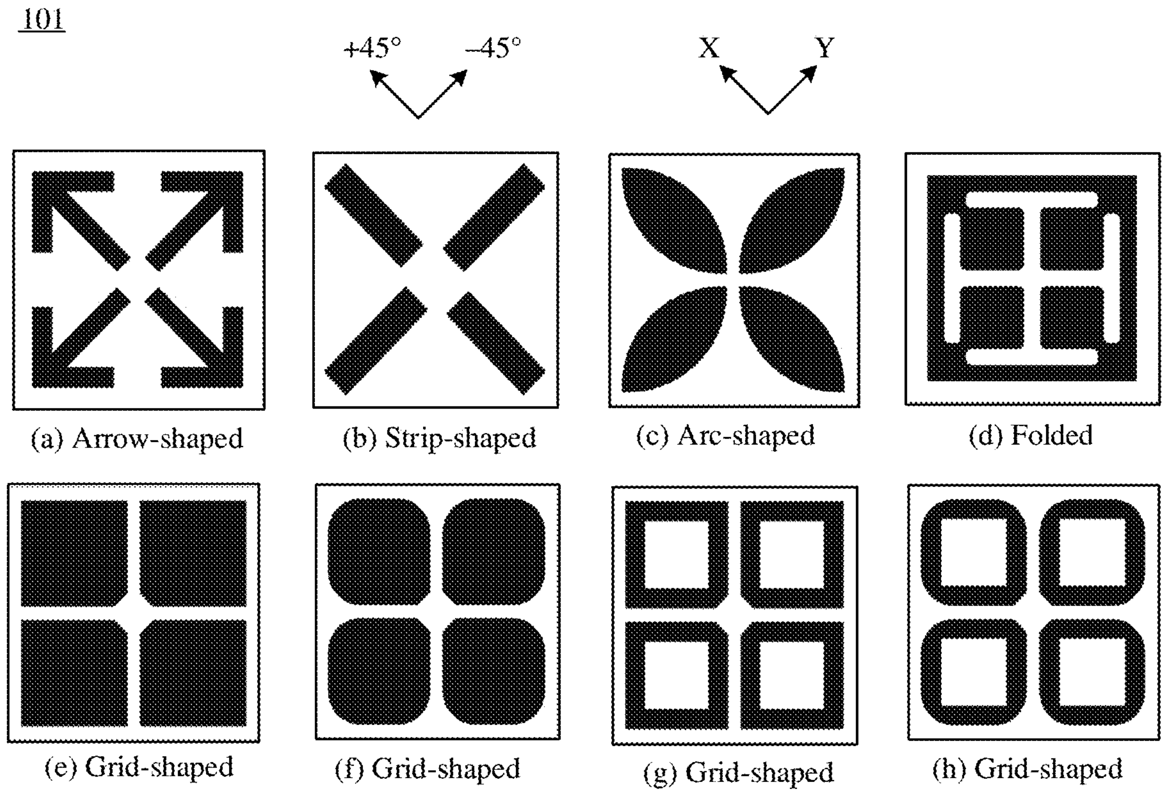
FIG. 13 is a top view of a dipole arm according to at least one embodiment of this application.

(a) in FIG. 13 to (h) in FIG. 13 are top views of the dipole arm according to at least one embodiment of this application.

As shown in FIG. 13, a dipole arm shown in (a) in FIG. 13 is an arrow-shaped dual-polarized dipole arm, a dipole arm shown in (b) in FIG. 13 is a strip-shaped dual-polarized dipole arm, a dipole arm shown in (c) in FIG. 13 is an arc-shaped dual-polarized dipole arm, a dipole arm shown in (d) in FIG. 13 is a folded dual-polarized dipole arm, and dipole arms shown in (e) in FIG. 13 to (h) in FIG. 13 are grid-shaped dual-polarized dipole arms.

FIG. 13 is described by using an example in which types (or shapes) of dipole arms in the first dipole arm pair 106 and the second dipole arm pair 107 are the same. Optionally, the types (or shapes) of the dipole arms in the first dipole arm pair 106 and the second dipole arm pair 107 may be different.

For example, both the first dipole arm 1061 and the second dipole arm 1062 are arrow-shaped dual-polarized dipole arms, and both the third dipole arm 1071 and the fourth dipole arm 1072 are arc-shaped dual-polarized dipole arms.

For another example, the first dipole arm 1061 is an arrow-shaped dual-polarized dipole arm, the second dipole arm 1062 is an arc-shaped dual-polarized dipole arm, the third dipole arm 1071 is an arrow-shaped dual-polarized dipole arm, and the fourth dipole arm 1072 is an arc-shaped dual-polarized dipole arm.

For another example, types of the first dipole arm 1061, the second dipole arm 1062, the third dipole arm 1071, and the fourth dipole arm 1072 may be different from each other, and are not listed one by one in embodiments of this application. In embodiments of this application, an example in which the dipole arm is an arrow-shaped dual-polarized dipole arm is used for description.

For example, the first dielectric layer 102 may be a printed circuit board (printed circuit board, PCB) dielectric, a ceramic dielectric, or the like.

In some embodiments, the first dielectric layer 102 may be a rectangle.

It should be noted that a shape of the first dielectric layer 102 is not limited in embodiments of this application. For example, the shape of the first dielectric layer 102 may be a rectangle, a square, a polygon, a circle, an ellipse, an irregular shape, or the like.

The following uses an example in which the shape of the first dielectric layer 102 is a square and the dipole arm is an arrow-shaped dual-polarized dipole arm for description.

In some embodiments, the first direction X is parallel to any diagonal of the first dielectric layer 102. Alternatively, the second direction Y is parallel to any diagonal of the first dielectric layer 102. Alternatively, when the shape of the first dielectric layer 102 is a square, the first direction X is parallel to one diagonal of the first dielectric layer 102, and the second direction Y is parallel to the other diagonal of the first dielectric layer 102.

For example, the first direction X is parallel to any diagonal of the first dielectric layer 102. As shown in FIG. 11*a*, the first direction X is parallel to one diagonal of the first dielectric layer 102, and the first dipole arm pair 106 may be disposed in a direction of any diagonal of the first dielectric layer 102. Certainly, the first direction X may be parallel to the other diagonal of the first dielectric layer 102. Details are not described herein.

In some other embodiments, the first direction X is parallel to any edge of the first dielectric layer 102. Alternatively, the first direction X is perpendicular to any edge of the first dielectric layer 102. Alternatively, the second direction Y is parallel to any edge of the first dielectric layer 102. Alternatively, the second direction Y is perpendicular to any edge of the first dielectric layer 102.

The first direction X is used as an example. As shown in FIG. 11*b*, the first direction X is parallel to a left edge (and a right edge) of the first dielectric layer 102, or this may be expressed as that the first direction X is perpendicular to an upper edge (and a lower edge) of the first dielectric layer 102. Certainly, the first direction X may be parallel to the upper edge (and the lower edge) of the first dielectric layer 102. Details are not described herein.

It should be noted that the first direction X and the second direction Y may be other directions that are not shown in FIG. 11*a* and FIG. 11*b*. Specific directions of the first direction X and the second direction Y are not limited in embodiments of this application, provided that the second direction Y is perpendicular to the first direction X.

FIG. 11*a* and FIG. 11*b* are described by using an example in which the dipole arm is an arrow-shaped dual-polarized dipole arm. This is also applicable to a dipole arm of another shape (for example, the dipole arm shown in FIG. 13), and details are not described one by one herein. The first metal layer 101 shown in FIG. 11*a* is used in cooperation with the second metal layer 103 shown in FIG. 12*a*, and the first metal layer 101 shown in FIG. 11*b* may be used in cooperation with the second metal layer 103 shown in FIG. 12*b*.

In some embodiments, the metal unit structure 1031 may include but is not limited to at least one of the following: a grid bar structure, a fishbone structure, and a resonant slot ring structure.

Figure 14:
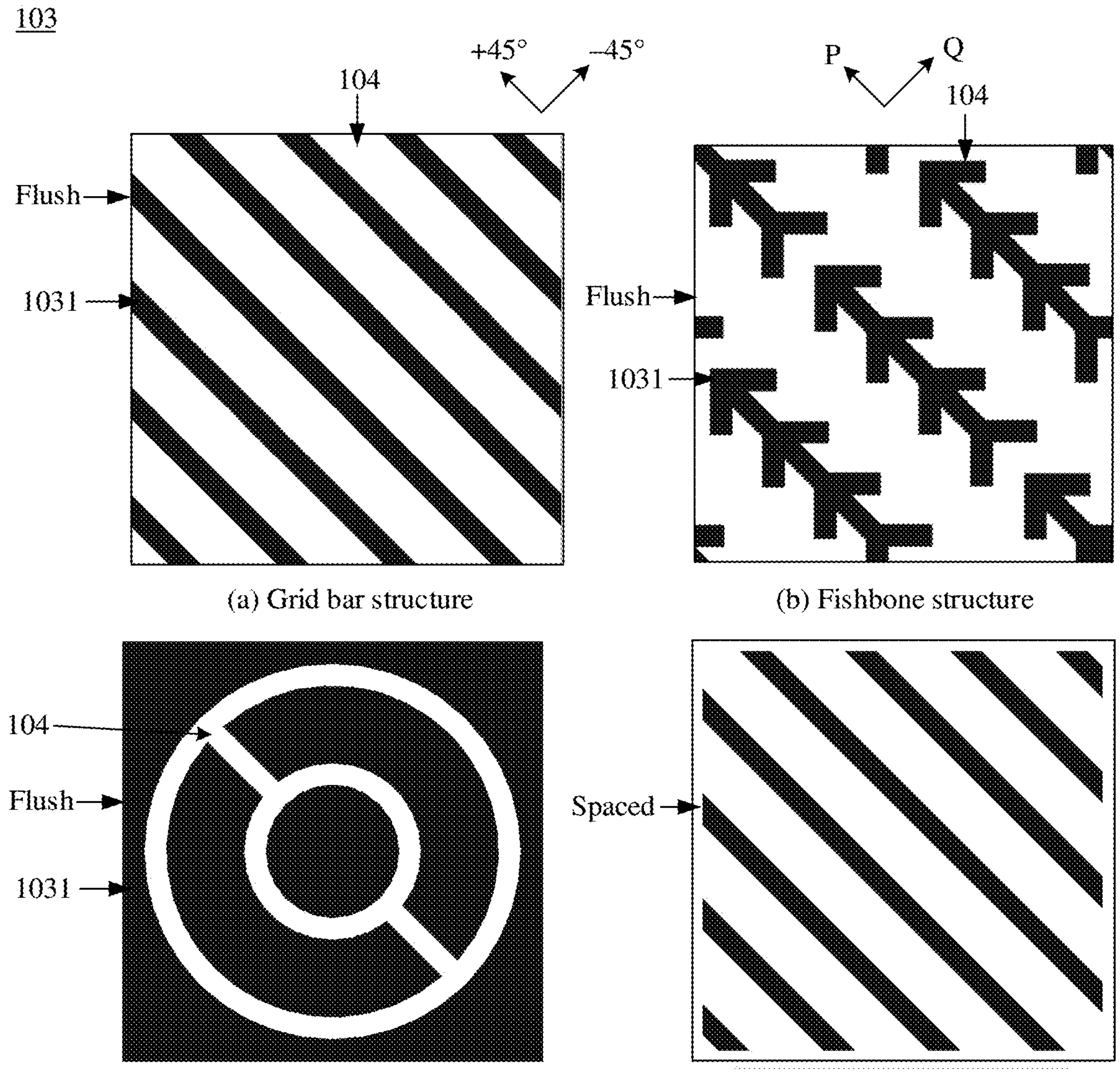
FIG. 14 is a top view of a second metal layer 103 according to at least one embodiment of this application.

FIG. 14 is a top view of a second metal layer 103 according to at least one embodiment of this application.

FIG. 14 is described by using an example in which the first direction X is parallel to any diagonal of the first dielectric layer 102, and the third direction P and the first direction X are parallel or have the first included angle. In other words, the third direction P shown in FIG. 14 and the first direction X shown in FIG. 11*a* are parallel or have the first included angle.

With reference to FIG. 14, a grid bar structure is shown in (a) in FIG. 14 and (d) in FIG. 14, and grid bars are arranged at an equal distance in the fourth direction Q perpendicular to the third direction P. A fishbone structure is shown in (b) in FIG. 14, and is arranged at an equal distance in the third direction P and the fourth direction Q. A resonant slot ring structure is shown in (c) in FIG. 14, and a second metal layer 103 of one metasurface unit may include one resonant slot ring.

In this way, the second metal layer 103 shown in FIG. 14 may be used in cooperation with the first metal layer 101 shown in FIG. 11*a* or FIG. 13.

When the first direction X is parallel to any edge of the first dielectric layer 102, and the third direction P and the first direction X are parallel or have the first included angle (that is, the third direction P and the first direction X shown in FIG. 11*b* are parallel or have the first included angle), for a schematic diagram of the fishbone structure or the resonant slot ring structure, refer to a schematic diagram of a grid bar structure d in FIG. 12*b*. Details are not described herein.

In at least one embodiment of this application, a spacing distance is not limited when the metal unit structures 1031 are arranged at an equal distance. For example, the spacing distance may be approximately equal to a wide side of the grid bar.

In some embodiments, at least one edge of the metal unit structure 1031 is flush with an edge of the second dielectric layer 104, or at least one edge of the metal unit structure 1031 is spaced from an edge of the second dielectric layer 104.

For example, the second dielectric layer 104 may be a PCB dielectric or a ceramic dielectric.

With reference to FIG. 14, an edge of the metal unit structure 1031 shown in (a) in FIG. 14 to (c) in FIG. 14 is flush with the edge of the second dielectric layer 104. In an example in which the metal unit structure 1031 is a grid bar structure, at least one side of a grid bar in the grid bar structure is flush with an edge of the second dielectric layer. For example, at least one side of the grid bar in the grid bar structure is flush with the edge of the second dielectric layer 104, or a wide side of the grid bar in the grid bar structure is flush with the edge of the second dielectric layer 104. Alternatively, a long side and a wide side of the grid bar in the grid bar structure are flush with edges of the second dielectric layer.

For example, the metasurface may include a plurality of metasurface units, and metal unit structures between the metasurface units of the metasurface may be connected. For example, the metal unit structure 1031 is a grid bar structure.

Each edge of the metal unit structure 1031 shown in (d) in FIG. 14 is spaced from a corresponding edge of the second dielectric layer 104. In an example in which the metal unit structure 1031 is a grid bar structure, at least one side of a grid bar in the grid bar structure is spaced from an edge of the second dielectric layer. For example, a long side of the grid bar in the grid bar structure is spaced from the edge of the second dielectric layer 104, or a wide side of the grid bar in the grid bar structure is spaced from the edge of the second dielectric layer 104. Alternatively, a long side and a wide side of the grid bar in the grid bar structure are spaced from edges of the second dielectric layer.

For example, the metasurface may include a plurality of metasurface units, and metal unit structures between the metasurface units of the metasurface may be spaced.

Optionally, some edges of the metal unit structure 1031 are spaced from corresponding edges of the second dielectric layer 104. For example, the metal unit structure 1031 is a grid bar structure. As shown in FIG. 12*b*, a long side of a grid bar in the grid bar structure is spaced from an edge of the second dielectric layer 104, and a wide side of the grid bar in the grid bar structure is flush with an edge of the second dielectric layer 104.

In some embodiments, the first included angle may be greater than or equal to −K° and less than or equal to +K°, and K is greater than 0 and less than 30.

In this way, two polarization directions of the metal unit structure are respectively approximately parallel to polarization directions of the first dipole arm pair 106 and the second dipole arm pair 107, or an included angle is greater than or equal to −K° and less than or equal to +K°.

When K is equal to 30, in an ideal situation (a manufacturing process of the metasurface unit is good), a principle polarization reflection gain loss of the metasurface unit is equal to 1.25 dB, and a scattering pattern XPD indicator is equal to 4.77 dB, which severely affect a receiving gain and a signal-to-noise ratio of a terminal device.

When K is greater than 30, in an ideal situation, a principle polarization reflection gain loss is greater than 1.25 dB, and a scattering pattern XPD indicator is less than 4.77 dB, which severely affect a receiving gain and a signal-to-noise ratio of a terminal device.

In some embodiments, K is equal to 20, and the first included angle may be greater than or equal to −20° and less than or equal to +20°.

When K is equal to 20 degrees, in an ideal situation, a principal polarization reflection gain loss is 0.55 dB, and a scattering pattern XPD indicator is 8.77 dB, which are basically acceptable.

When the third direction P may be parallel to or approximately parallel to the first direction X or the second direction Y, or the first included angle is 0°, in an ideal situation, the principal polarization reflection gain loss is 0 dB, and the scattering pattern XPD indicator tends to be infinite. This is an optimal state.

In this way, an orthogonal polarization direction of the second metal layer and an orthogonal polarization direction of the first metal layer are the same or approximately the same or have the first included angle. Therefore, the metasurface unit provided in at least one embodiment of this application can further implement co-polarized electromagnetic wave reflection based on implementation of a wideband and a high reflection phase linearity, is applicable to an intelligent reflecting surface, and may be applied to a reconfigurable reflecting array antenna, a co-polarized reflecting array, and the like.

In some embodiments, the first dipole arm 1061 in the first dipole arm pair 106 is connected to the third metal layer 105 through a first radial stub 1081, and the second dipole arm 1062 in the first dipole arm pair 106 is connected to a first feeder 1091 through a second radial stub 1082. The third dipole arm 1071 in the second dipole arm pair 107 is connected to the third metal layer 105 through a third radial stub 1083, and the fourth dipole arm 1072 in the second dipole arm pair 107 is connected to a third feeder 1092 through a fourth radial stub 1084.

For example, a radial stub (for example, the first radial stub 1081, the second radial stub 1082, the third radial stub 1083, or the fourth radial stub 1084) may be configured to isolate a radio frequency signal from a direct current signal. The radial stub may be replaced with another corresponding name, provided that a corresponding function can be implemented.

For example, a feeder (for example, the first feeder 1091 or the third feeder 1092) may be configured to input a voltage.

Figure 15:
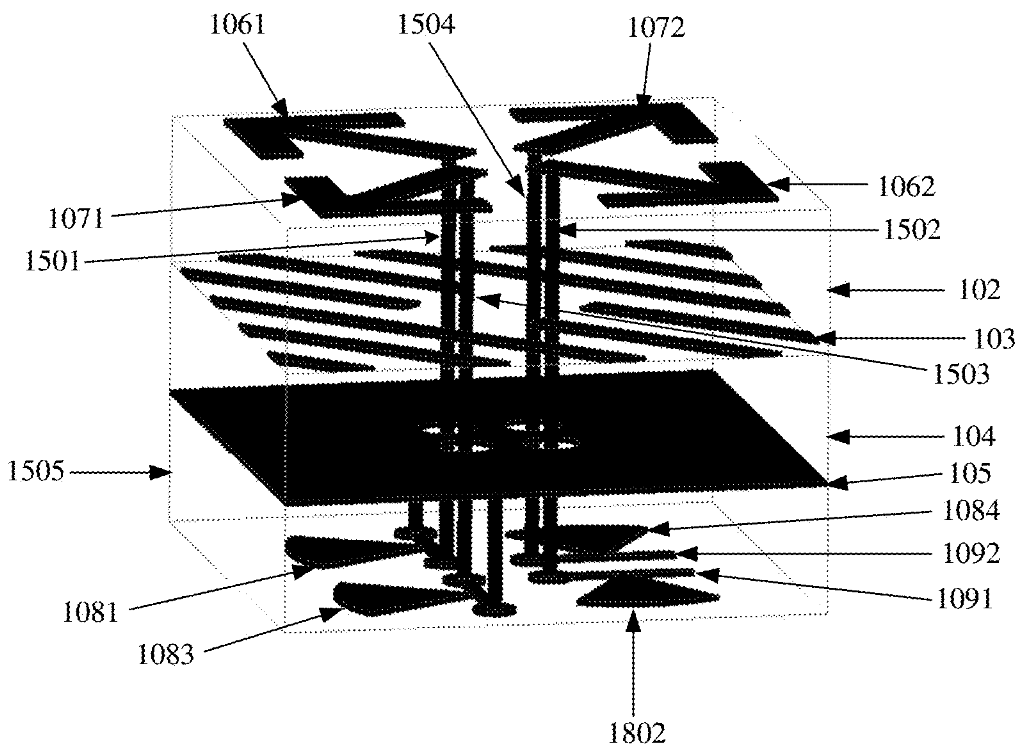
FIG. 15 is a perspective view of a metasurface unit according to at least one embodiment of this application.

FIG. 15 is a perspective view of a metasurface unit according to at least one embodiment of this application.

As shown in FIG. 15, the first dipole arm 1061 is connected to the third metal layer 105 through a first wire channel 1501 and the first radial stub 1081, and the second dipole arm 1062 is connected to the first feeder 1091 through a second wire channel 1502 and the second radial stub 1082. The third dipole arm 1071 is connected to the third metal layer 105 through a third wire channel 1503 and the third radial stub 1083, and the fourth dipole arm 1072 is connected to the third feeder 1092 through a fourth wire channel 1504 and the fourth radial stub 1084.

It should be noted that the first wire channel 1501, the second wire channel 1502, the third wire channel 1503, or the fourth wire channel 1504 may be connected to the dipole arm at a position shown in FIG. 15 (a position close to one end of the dipole arm), or may be connected to the dipole arm at another position that is not shown in FIG. 15.

In some embodiments, as shown in FIG. 15, the metasurface unit may further include a fourth dielectric layer 1505, and the first radial stub 1081, the second radial stub 1082, the third radial stub 1083, the fourth radial stub 1084, the first feeder 1091, and the third feeder 1092 are all disposed on a side that is of the fourth dielectric layer 1505 and that is away from the third metal layer 105. The first wire channel 1501, the second wire channel 1502, the third wire channel 1503, and the fourth wire channel 1504 pass through the first dielectric layer 102, the second metal layer 103, the second dielectric layer 104, and the third metal layer 105.

Figure 16:
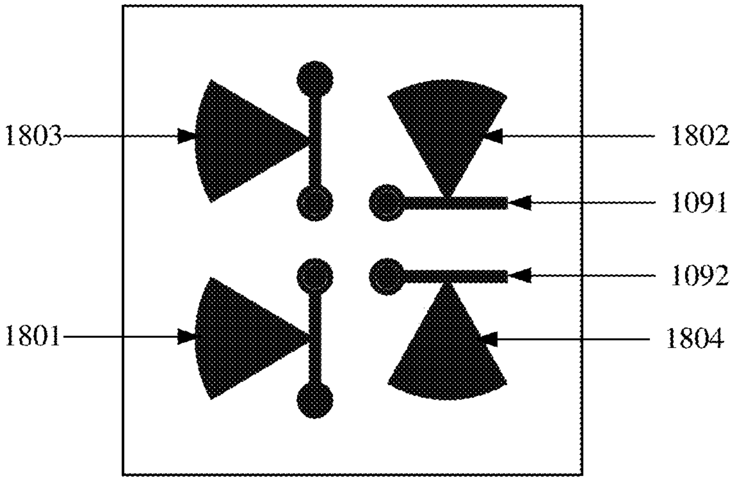
FIG. 16 is a bottom view of FIG. 15.

FIG. 16 is a bottom view of the metasurface unit shown in FIG. 15. The first radial stub 1081, the second radial stub 1082, the third radial stub 1083, and the fourth radial stub 1084 are shown in FIG. 16.

Figure 17:
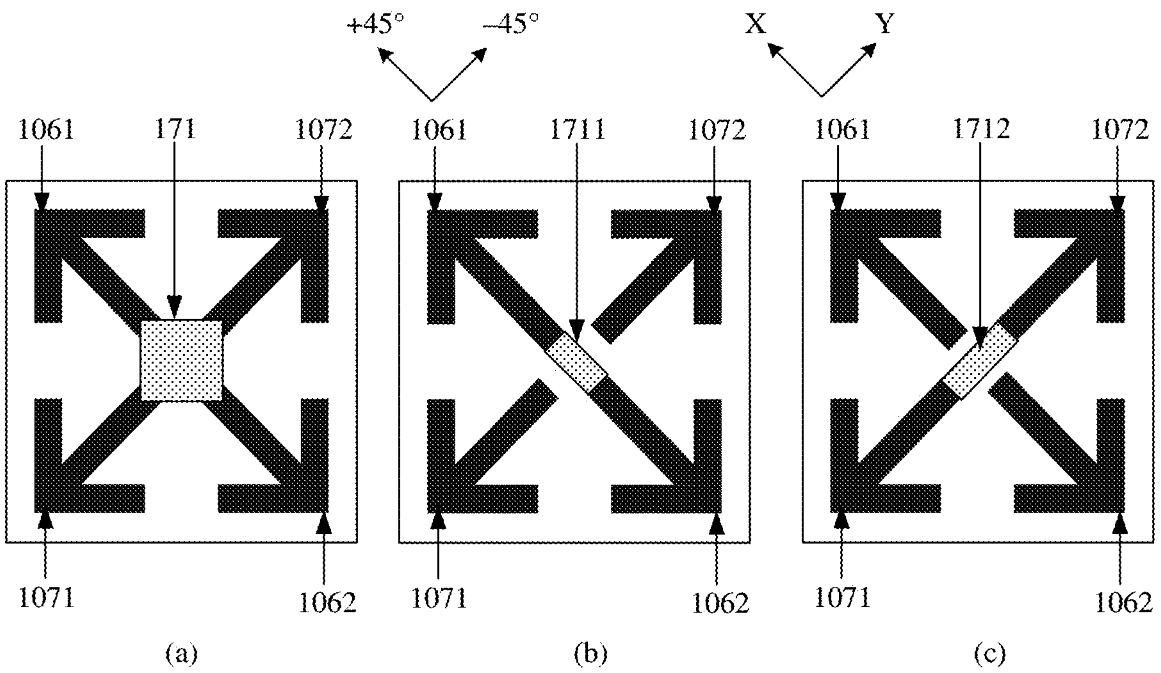
FIG. 17 is a top view of a metasurface unit according to at least one embodiment of this application.

FIG. 17 is a top view of a metasurface unit according to at least one embodiment of this application.

In some embodiments, the metasurface unit may further include a switch.

With reference to (b) in FIG. 17 and (c) in FIG. 17, a switch 171 may include a first switch 1711 and a second switch 1712.

With reference to (b) in FIG. 17, the first dipole arm 1061 is connected to the second dipole arm 1062 through the first switch 1711. With reference to (c) in FIG. 17, the third dipole arm 1071 is connected to the fourth dipole arm 1072 through the second switch 1712.

For example, the switch may include one or more of the following: a double-pole double-throw (double pole double throw, DPDT) switch, a positive-intrinsic-negative PIN diode, a variable capacitance diode, a micro-electro-mechanical system (micro-electro-mechanical systems, MEMS) switch, and a photosensitive switch.

Optionally, the first switch 1711 and the second switch 1712 may be independent of each other, or the first switch 1711 and the second switch 1712 may be integrated into one component.

For example, when the first dipole arm 1061 and the second dipole arm 1062 are turned on (ON) by using the first switch 1711, and the third dipole arm 1071 and the fourth dipole arm 1072 are turned off (OFF) by using the second switch 1712, a reflection state of the metasurface unit for an electromagnetic wave may be defined as a state "0". For details, refer to the second column in Table 1. When the first dipole arm 1061 and the second dipole arm 1062 are turned off (OFF) by using the first switch 1711, and the third dipole arm 1071 and the fourth dipole arm 1072 are turned on (ON) by using the second switch 1712, a reflection state of the metasurface unit for an electromagnetic wave may be defined as a state "1". For details, refer to the third column in Table 1.

TABLE 1

| First column | Second column | Third column |
|---|---|---|
| First switch 1711 of 1061 and 1062 | ON | OFF |
| Second switch 1712 of 1071 and 1072 | OFF | ON |
| Reflection phase | 0° | 180° |
| Coding state | 0 | 1 |

Alternatively, that the first switch 1711 is turned on (ON) and the second switch 1712 is turned off (OFF) may be defined as a state "1", and that the first switch 1711 is turned off (OFF) and the second switch 1712 is turned on (ON) is defined as a state "0". This is not limited in at least one embodiment of this application.

In this way, in the two states "0" and "1", after the metasurface unit is irradiated by an electromagnetic wave, a difference between phases of co-polarized reflected electromagnetic waves of the metasurface unit is approximately 180 degrees, so that a 1-bit (bit) phase coding function can be implemented.

Figure 18:
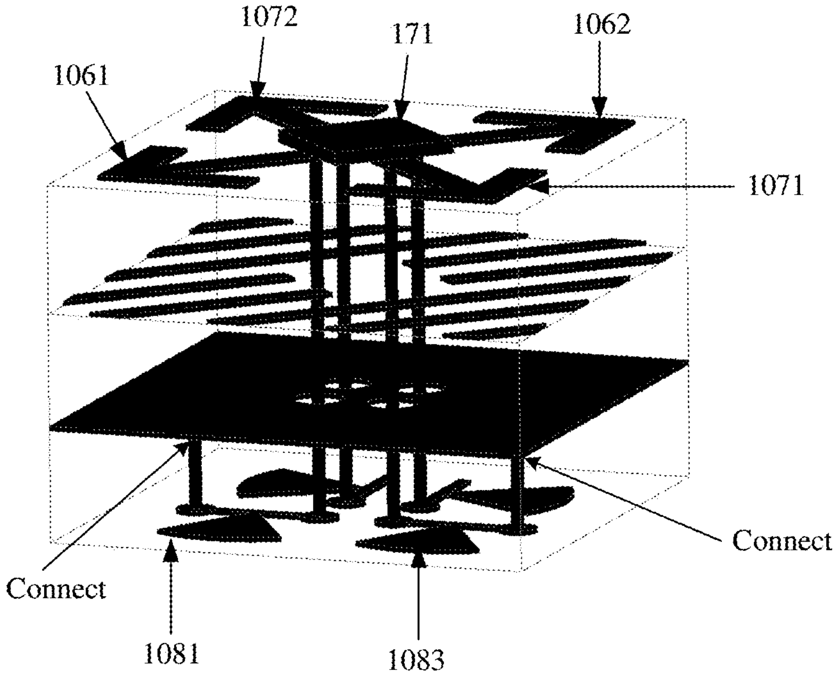
FIG. 18 is a perspective view of a metasurface unit according to at least one embodiment of this application.

FIG. 18 is a perspective view of a metasurface unit according to at least one embodiment of this application.

In some embodiments, the metasurface unit shown in FIG. 15 may be used in combination with the first switch 1711 and the second switch 1712 shown in (a) in FIG. 17 and (b) in FIG. 17, so that a difference between phases of co-polarized reflected electromagnetic waves of the metasurface unit is 180 degrees, to implement a 1-bit phase coding function. Details are shown in FIG. 18.

For example, a specific voltage (for example, a first threshold) is input by using the first feeder 1091, and the first switch 1711 is turned on (ON). If the voltage input by the first feeder 1091 is 0 V or is less than the first threshold, the first switch 1711 is turned off (OFF). A specific voltage (for example, the first threshold) is input by using the third feeder 1092, and the second switch 1712 is turned on (ON). If the voltage input by the third feeder 1092 is 0 V or is less than the first threshold, the second switch 1712 is turned off (OFF). In this way, a 1-bit phase coding function can be implemented.

In some other embodiments, the first dipole arm 1061 in the first dipole arm pair 106 is connected to the third metal layer 105 through the first radial stub 1081, and the second dipole arm 1062 in the first dipole arm pair 106 is connected to the third metal layer 105 through the second radial stub 1082. The third dipole arm 1071 in the second dipole arm pair 107 is connected to the second feeder 1093 through the third radial stub 1083, and the fourth dipole arm 1072 in the second dipole arm pair 107 is connected to the third feeder 1092 through the fourth radial stub 1084.

It should be noted that the connection in embodiments of this application may be an electrical connection.

For example, a feeder (for example, the second feeder 1093 or the third feeder 1092) may be configured to input a voltage.

Figure 19:
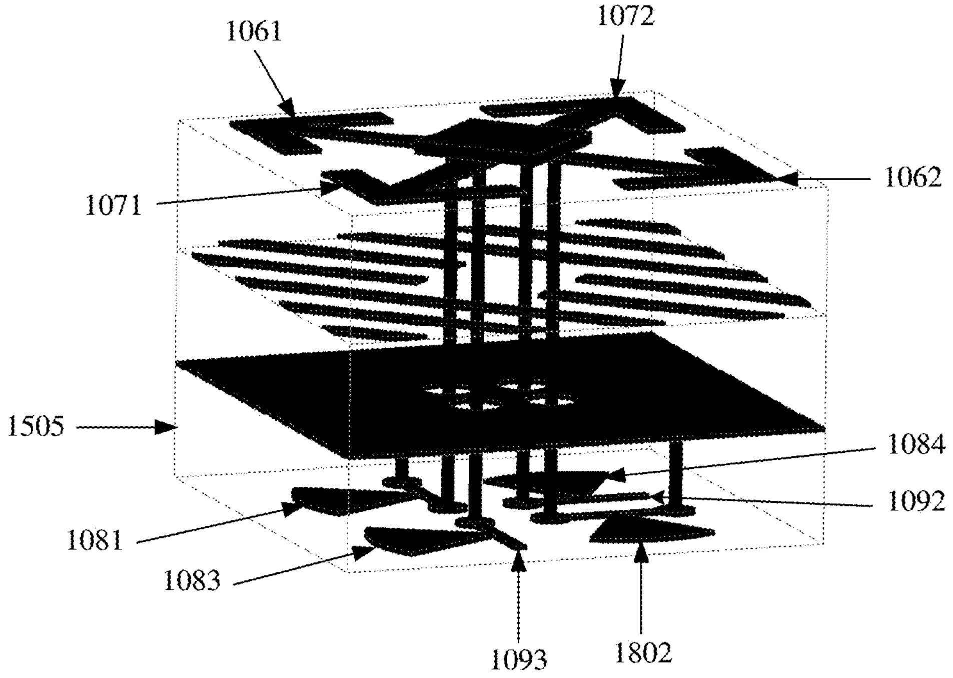
FIG. 19 is a perspective view of another metasurface unit according to at least one embodiment of this application.

FIG. 19 is a perspective view of another metasurface unit according to at least one embodiment of this application.

As shown in FIG. 19, the first dipole arm 1061 is connected to the third metal layer 105 through the first wire channel 1501 and the first radial stub 1081, and the second dipole arm 1062 is connected to the third metal layer 105 through the second wire channel 1502 and the second radial stub 1082. The third dipole arm 1071 is connected to the second feeder 1093 through the third radial stub 1083, and the fourth dipole arm 1072 is connected to the third feeder 1092 through the fourth radial stub 1084.

In some embodiments, as shown in FIG. 19, the metasurface unit may further include a fourth dielectric layer 1505, and the first radial stub 1081, the second radial stub 1082, the third radial stub 1083, the fourth radial stub 1084, the first feeder 1091, and the third feeder 1092 are all disposed on a side that is of the fourth dielectric layer 1505 and that is away from the third metal layer 105. The first wire channel 1501, the second wire channel 1502, the third wire channel 1503, and the fourth wire channel 1504 pass through the first dielectric layer 102, the second metal layer 103, the second dielectric layer 104, and the third metal layer 105.

Figure 20:
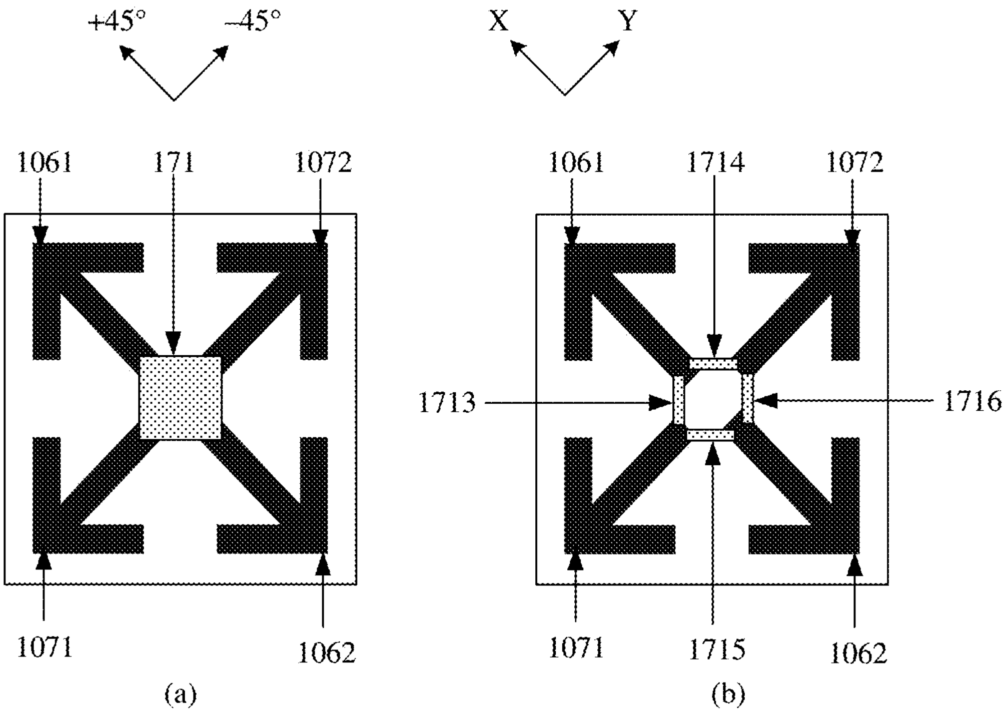
FIG. 20 is a top view of a metasurface unit according to at least one embodiment of this application.

FIG. 20 is a top view of a metasurface unit according to at least one embodiment of this application.

In some embodiments, the metasurface unit may further include a switch 171, as shown in (a) in FIG. 20.

With reference to (b) in FIG. 20, the switch 171 may include a third switch 1713, a fourth switch 1714, a fifth switch 1715, and a sixth switch 1716. The first dipole arm 1061 is connected to the third dipole arm 1071 through the third switch 1713, the first dipole arm 1061 is connected to the fourth dipole arm 1072 through the fourth switch 1714, the second dipole arm 1062 is connected to the third dipole arm 1071 through the fifth switch 1715, and the second dipole arm 1062 is connected to the fourth dipole arm 1072 through the sixth switch 1716.

Optionally, the third switch 1713, the fourth switch 1714, the fifth switch 1715, and the sixth switch 1716 may be independent of each other, or the third switch 1713, the fourth switch 1714, the fifth switch 1715, and the sixth switch 1716 may be integrated into one component, or any two or any three of the third switch 1713, the fourth switch 1714, the fifth switch 1715, and the sixth switch 1716 are integrated into one component.

Alternatively, optionally, the metasurface unit may include a first switch 1711, a second switch 1712, a third switch 1713, a fourth switch 1714, a fifth switch 1715, and a sixth switch 1716. When a 1-bit phase coding function is to be implemented, the first switch 1711 and the second switch 1712 are used. When a 2-bit phase coding function is to be implemented, the third switch 1713, the fourth switch 1714, the fifth switch 1715, and the sixth switch 1716 are used.

The first switch 1711, the second switch 1712, the third switch 1713, the fourth switch 1714, the fifth switch 1715, and the sixth switch 1716 may be randomly integrated or independent of each other. This is not limited in this application.

TABLE 2

| | First column | Second column | Third column | Fourth column |
|---|---|---|---|---|
| Fourth switch 1714 of 1061 and 1072 | OFF | ON | ON | OFF |
| Sixth switch 1716 of 1072 and 1062 | OFF | ON | ON | OFF |
| Fifth switch 1715 of 1062 and 1071 | OFF | ON | OFF | ON |
| Third switch 1713 of 1071 and 1061 | OFF | ON | OFF | ON |
| Reflection phase | 0° | 90° | 180° | 270° |
| Coding state | 00 | 01 | 10 | 11 |

In this way, a 2-bit phase coding function is implemented by using four switches. For a 2-bit coding state corresponding to states of the third switch 1713, the fourth switch 1714, the fifth switch 1715, and the sixth switch 1716, refer to Table 2.

It should be noted that, in at least one embodiment of this application, the coding state corresponding to the states of the third switch 1713, the fourth switch 1714, the fifth switch 1715, and the sixth switch 1716 in Table 2 is not limited, provided that a 2-bit phase coding function can be implemented.

In some embodiments, the metasurface unit shown in FIG. 19 may be used in combination with the third switch 1713, the fourth switch 1714, the fifth switch 1715, and the sixth switch 1716 shown in (b) in FIG. 20, so that a difference between phases of co-polarized reflected electromagnetic waves of the metasurface unit is 90 degrees, to implement a 2-bit phase coding function.

For example, with reference to FIG. 19 and FIG. 20, a specific voltage (for example, a first threshold) is input by using the second feeder 1093, and the third switch 1713 and the fifth switch 1715 are turned on (ON). If the voltage input by the second feeder 1093 is 0 V or is less than the first threshold, the third switch 1713 and the fifth switch 1715 are turned off (OFF). A specific voltage (for example, the first threshold) is input by using the third feeder 1092, and the fourth switch 1714 and the sixth switch 1716 are turned on (ON). If the voltage input by the third feeder 1092 is 0 V or is less than the first threshold, the fourth switch 1714 and the sixth switch 1716 are turned off (OFF). In this way, a 2-bit phase coding function can be implemented.

In some embodiments, the switch 171 is disposed on a side that is of the first metal layer 101 and that is away from the first dielectric layer 102.

With reference to FIG. 17 and FIG. 18, both the first switch 1711 and the second switch 1712 may be disposed on the side that is of the first metal layer 101 and that is away from the first dielectric layer 102.

With reference to FIG. 19 and FIG. 20, the third switch 1713, the fourth switch 1714, the fifth switch 1715, and the sixth switch 1716 may all be disposed on the side that is of the first metal layer 101 and that is away from the first dielectric layer 102.

Figure 21:
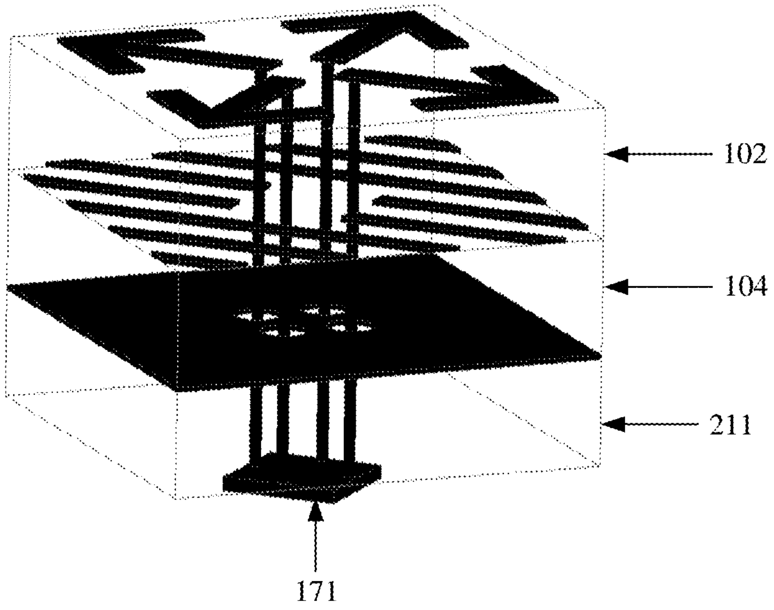
FIG. 21 is a perspective view of a metasurface unit according to at least one embodiment of this application.

FIG. 21 is a perspective view of a metasurface unit according to at least one embodiment of this application.

In some other embodiments, as shown in FIG. 21, the metasurface unit may further include a third dielectric layer 211, the third dielectric layer 211 is disposed on a side that is of the third metal layer 105 and that is away from the second dielectric layer 104, and the switch 171 is disposed on a side that is of the third dielectric layer 211 and that is away from the third metal layer 105.

For example, the switch 171 includes the first switch 1711 and the second switch 1712, which are disposed on the side that is of the third dielectric layer 211 and that is away from the third metal layer 105.

For another example, the third switch 1713, the fourth switch 1714, the fifth switch 1715, and the sixth switch 1716 are all disposed on the side that is of the third dielectric layer 211 and that is away from the third metal layer 105.

In some embodiments, when the metasurface unit shown in FIG. 15 is used in combination with the switch 171 and the third dielectric layer 211 shown in FIG. 21, the fourth dielectric layer 1505 and the third dielectric layer 211 may be a same dielectric layer, the switch 171 may be disposed at a same metal layer as the first radial stub 1081, the second radial stub 1082, the third radial stub 1083, the fourth radial stub 1084, the first feeder 1091, and the third feeder 1092; or the fourth dielectric layer 1505 and the third dielectric layer 211 may be different dielectric layers, and the switch 171 may be disposed at a different metal layer from the first radial stub 1081, the second radial stub 1082, the third radial stub 1083, the fourth radial stub 1084, the first feeder 1091, and the third feeder 1092.

In some other embodiments, some switches included in the switch 171 are disposed on a side that is of the first metal layer 101 and that is away from the first dielectric layer 102, and the other switches included in the switch 171 are disposed on a side that is of the third dielectric layer 211 and that is away from the third metal layer 105.

Figure 22:
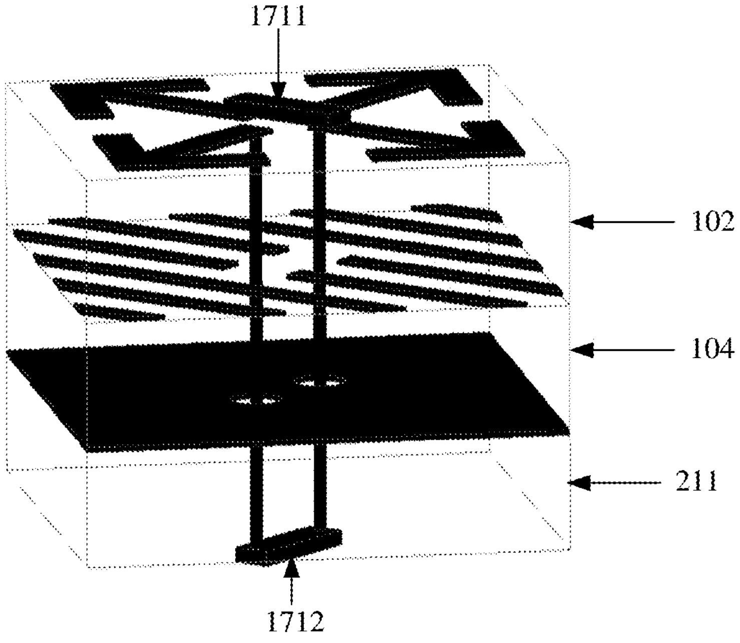
FIG. 22 is a perspective view of a metasurface unit according to at least one embodiment of this application.

FIG. 22 is a perspective view of a metasurface unit according to at least one embodiment of this application.

For example, with reference to FIG. 22, the first switch 1711 is disposed on a side that is of the first metal layer 101 and that is away from the first dielectric layer 102. The metasurface unit may further include a third dielectric layer 211. The third dielectric layer 211 is disposed on a side that is of the third metal layer 105 and that is away from the second dielectric layer 104. The second switch 1712 is disposed on a side that is of the third dielectric layer 211 and that is away from the third metal layer 105.

For another example, one or more of the third switch 1713, the fourth switch 1714, the fifth switch 1715, and the sixth switch 1716 are disposed on a side that is of the first metal layer 101 and that is away from the first dielectric layer 102, and the other switches are disposed on a side that is of the third dielectric layer 211 and that is away from the third metal layer 105. Details are not described one by one herein.

In some embodiments, when the metasurface unit shown in FIG. 15 is used in combination with the switch 171 and the third dielectric layer 211 shown in FIG. 22, the fourth dielectric layer 1505 and the third dielectric layer 211 may be a same dielectric layer, the second switch 1712 may be disposed at a same metal layer as the first radial stub 1081, the second radial stub 1082, the third radial stub 1083, the fourth radial stub 1084, the first feeder 1091, and the third feeder 1092; or the fourth dielectric layer 1505 and the third dielectric layer 211 may be different dielectric layers, and the second switch 1712 may be disposed at a different metal layer from the first radial stub 1081, the second radial stub 1082, the third radial stub 1083, the fourth radial stub 1084, the first feeder 1091, and the third feeder 1092.

Figure 23:
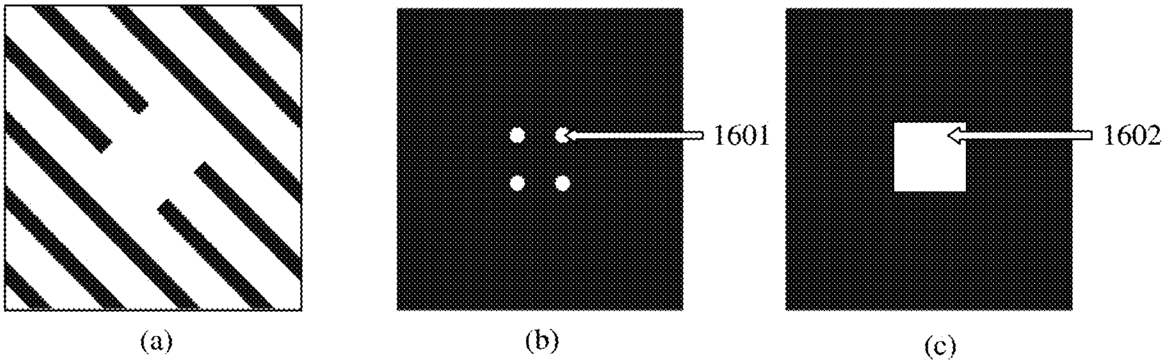
FIG. 23 is a top view of a second metal layer 103 and a third metal layer 105 of the metasurface unit shown in FIG. 15, FIG. 18, or FIG. 19.

FIG. 23 is a top view of the second metal layer 103 and the third metal layer 105 of the metasurface unit shown in FIG. 15, FIG. 18, or FIG. 19.

As shown in (a) in FIG. 23, the metal unit structure 1031 included in the second metal layer 103 avoids the first wire channel 1501, the second wire channel 1502, the third wire channel 1503, and the fourth wire channel 1504, so that the second metal layer 103 is connected to none of the first wire channel 1501, the second wire channel 1502, the third wire channel 1503, and the fourth wire channel 1504.

For example, the metal unit structure 1031 is a grid bar structure, and a grid bar may be discontinuous.

As shown in (b) in FIG. 23, the third metal layer 105 is provided with four circular avoidance holes 1601. For example, the first wire channel 1501, the second wire channel 1502, the third wire channel 1503, and the fourth wire channel 1504 each penetrate the third metal layer 105 through one avoidance hole 1601.

For example, a diameter of the avoidance hole 1601 may be greater than a first diameter, and the first diameter may be a maximum value in an outer diameter of the first wire channel 1501, an outer diameter of the second wire channel 1502, an outer diameter of the third wire channel 1503, and an outer diameter of the fourth wire channel 1504.

As shown in (c) in FIG. 23, the third metal layer 105 is provided with a square avoidance hole 1602. For example, the first wire channel 1501, the second wire channel 1502, the third wire channel 1503, and the fourth wire channel 1504 penetrate the third metal layer 105 through the avoidance hole 1602. Alternatively, the avoidance hole 1602 may be circular.

It should be noted that the avoidance hole may be in any shape, provided that the third metal layer 105 is connected to none of the first wire channel 1501, the second wire channel 1502, the third wire channel 1503, and the fourth wire channel 1504.

In some embodiments, with reference to FIG. 15, FIG. 18, or FIG. 19, the first radial stub 1081, the second radial stub 1082, the third radial stub 1083, and the fourth radial stub 1084 may be disposed in the third dielectric layer 104. For example, the third dielectric layer 104 is a ceramic dielectric.

Correspondingly, the second metal layer 103 and the third metal layer 105 may not avoid the first wire channel 1501 and the third wire channel 1503. The metasurface unit may further include a fourth dielectric layer 1505, and the first feeder 1091 and the third feeder 1092 are disposed on a side that is of the fourth dielectric layer 1505 and that is away from the third metal layer 105.

In some other embodiments, the metasurface unit may further include the fourth dielectric layer 1505, and the first radial stub 1081, the second radial stub 1082, the third radial stub 1083, and the fourth radial stub 1084 may be disposed in the fourth dielectric layer 1505. For example, the fourth dielectric layer 1505 is a ceramic dielectric. The first feeder 1091 and the third feeder 1092 are disposed on a side that is of the fourth dielectric layer 1505 and that is away from the third metal layer 105.

In some embodiments, there are J second metal layers 103, there are J second dielectric layers 104, J is an integer greater than or equal to 2, and the second metal layers 103 and the second dielectric layers 104 are alternately arranged.

Figure 24:
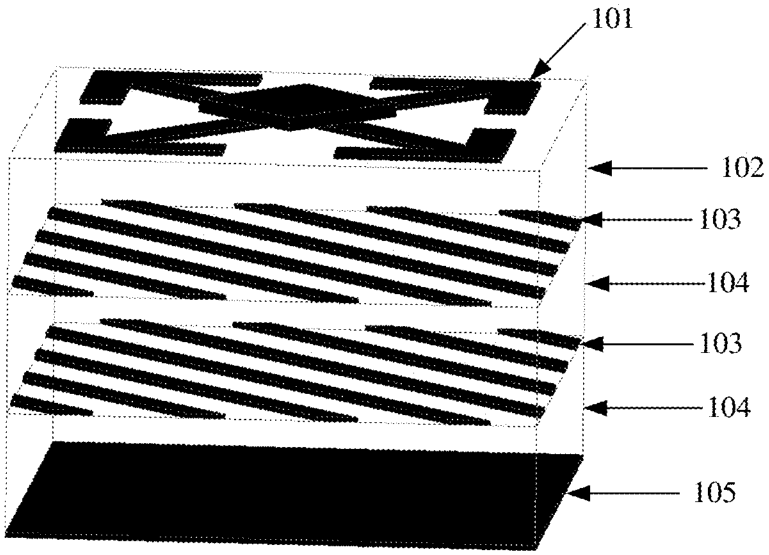
FIG. 24 is a perspective view of a metasurface unit according to at least one embodiment of this application.

FIG. 24 is a perspective view of a metasurface unit according to at least one embodiment of this application. In FIG. 24, an example in which J is equal to 2 is used. For specific implementations of the second metal layer 103 and the second dielectric layer 104, refer to the foregoing corresponding descriptions. Details are not described herein again.

A quantity of second metal layers 103 and a quantity of second dielectric layers 104 are greater than or equal to 2, so that effect the same as or better than that of a single second metal layer 103 and a single second dielectric layer 104 can be achieved.

According to the metasurface unit provided in embodiments of this application, a reflection polarization characteristic of the metasurface unit may be regulated by using a second metal structure, to implement a metasurface unit with a wideband and a high reflection phase linearity, eliminate a polarization twist characteristic, implement a reflecting surface unit with a wideband, a high phase linearity, and co-polarization reflection, and resolve a problem that a phase bandwidth and polarization twist cannot be balanced.

Figure 25:
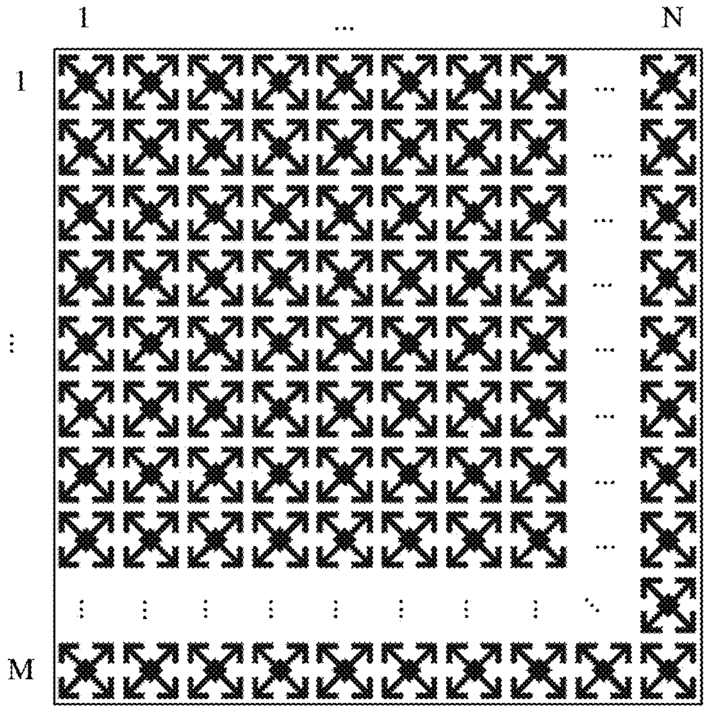
FIG. 25 is a top view of a metasurface according to at least one embodiment of this application.

FIG. 25 is a top view of a metasurface according to at least one embodiment of this application.

For example, the metasurface may include one or more metasurface units shown in any one or more of the foregoing embodiments. A plurality of metasurface units may be periodically or aperiodically arranged, and the plurality of metasurface units may be the same or different.

For example, first metal layers between the metasurface units are different. For another example, second metal layers between the metasurface units are different. For another example, switch positions between the metasurface units are different. Details are not listed one by one in embodiments of this application.

As shown in FIG. 25, the metasurface may include N×M metasurface units. For example, each row includes N metasurface units, and each column includes M metasurface units.

In this way, each unit may dynamically receive and reflect electromagnetic waves under control of the switch, and superimpose and combine the electromagnetic waves in space, to implement dynamic beam modulation.

For a technical effect of the metasurface, refer to the technical effect of the foregoing metasurface unit. Details are not described herein again.

Figure 26:
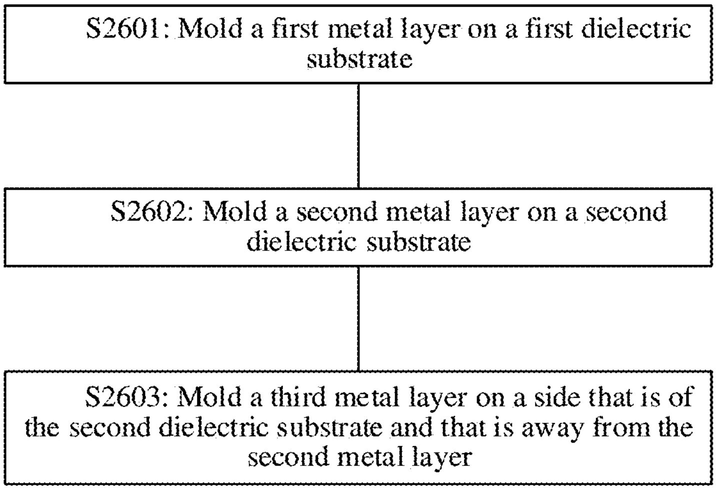
FIG. 26 is a schematic flowchart of a metasurface or metasurface unit design method according to at least one embodiment of this application.

For example, FIG. 26 is a schematic flowchart of a metasurface or metasurface unit design method according to at least one embodiment of this application.

As shown in FIG. 26, the metasurface or metasurface unit design method includes the following steps.

S2601: Mold a first metal layer on a first dielectric layer.

For example, the first metal layer may include a first dipole arm pair and a second dipole arm pair, the first dipole arm pair is disposed in a first direction, and the second dipole arm pair is disposed in a second direction perpendicular to the first direction.

For example, the first dipole arm pair includes a first dipole arm and a second dipole arm, and the second dipole arm pair includes a third dipole arm and a fourth dipole arm.

It should be noted that, for a specific implementation of the first metal layer, refer to FIG. 11*a* and FIG. 11*b*.

In some embodiments, the dipole arm may include but is not limited to at least one of the following: an arrow-shaped dipole arm, a strip-shaped dual-polarized dipole arm, an arc-shaped dual-polarized dipole arm, a folded dual-polarized dipole arm, and a grid-shaped dual-polarized dipole arm. For details, refer to the description corresponding to FIG. 13.

In some embodiments, the first dielectric layer is a rectangle.

It should be noted that a shape of the first dielectric layer 102 is not limited in embodiments of this application. For example, the shape of the first dielectric layer 102 may be a rectangle, a square, a polygon, or the like.

In some embodiments, the first direction is parallel to any diagonal of the first dielectric layer. Alternatively, the second direction is parallel to any diagonal of the first dielectric layer. Alternatively, when the shape of the first dielectric layer is a square, the first direction is parallel to one diagonal of the first dielectric layer, and the second direction is parallel to the other diagonal of the first dielectric layer. For a specific implementation, refer to the foregoing corresponding description. Details are not described herein again.

In some embodiments, the first direction is parallel to any edge of the first dielectric layer. Alternatively, the first direction is perpendicular to any edge of the first dielectric layer. Alternatively, the second direction is parallel to any edge of the first dielectric layer. Alternatively, the second direction is perpendicular to any edge of the first dielectric layer. For a specific implementation, refer to the foregoing corresponding description. Details are not described herein again.

S2602: Mold a second metal layer on a second dielectric layer.

For example, the second metal layer includes at least one of the following: metal unit structures arranged at an equal distance in a third direction, metal unit structures arranged at an equal distance in a fourth direction perpendicular to the third direction, and metal unit structures arranged at an equal distance in the third direction and the fourth direction. The third direction and the first direction or the second direction are parallel or have a first included angle. For a specific implementation, refer to the descriptions corresponding to FIG. 12*a* and FIG. 12*b*.

In some embodiments, the metal unit structure includes but is not limited to at least one of the following: a grid bar structure, a fishbone structure, or a resonant slot ring structure. For a specific implementation, refer to the description corresponding to FIG. 14.

In some embodiments, an edge of the metal unit structure is flush with an edge of the second dielectric layer, or an edge of the metal unit structure is spaced from an edge of the second dielectric layer. For a specific implementation, refer to corresponding descriptions in the foregoing apparatus embodiments.

Optionally, at least one side of a grid bar in the grid bar structure is flush with the edge of the second dielectric layer. To be specific, in an example in which the metal unit structure is a grid bar structure, a long side of the grid bar in the grid bar structure is flush with the edge of the second dielectric layer, or a wide side of the grid bar in the grid bar structure is flush with the edge of the second dielectric layer. Alternatively, a long side and a wide side of the grid bar in the grid bar structure are flush with edges of the second dielectric layer.

Optionally, at least one side of a grid bar in the grid bar structure is spaced from the edge of the second dielectric layer. To be specific, in an example in which the metal unit structure is a grid bar structure, a long side of the grid bar in the grid bar structure is spaced from the edge of the second dielectric layer, or a wide side of the grid bar in the grid bar structure is spaced from the edge of the second dielectric layer. Alternatively, a long side and a wide side of the grid bar in the grid bar structure are spaced from edges of the second dielectric layer.

In a possible design, the first included angle is greater than or equal to −K° and less than or equal to +K°, and K is greater than 0 and less than 30. For example, K is equal to 20. For a specific implementation, refer to the foregoing corresponding description. Details are not described herein again.

In some embodiments, there are J second metal layers, there are J second dielectric layers, and J is an integer greater than or equal to 2. For details, refer to the description corresponding to FIG. 24.

Optionally, the metasurface design method provided in at least one embodiment of this application may further include: alternately molding the second metal layers and the second dielectric layers.

S2603: Mold a third metal layer on a side that is of the second dielectric layer and that is away from the second metal layer.

In some embodiments, the third metal layer 105 may be a metallic ground, and can reflect an electromagnetic wave.

In a possible design, the metasurface design method provided in at least one embodiment of this application may further include: connecting the first dipole arm in the first dipole arm pair to the third metal layer through a first radial stub, and connecting the second dipole arm in the first dipole arm pair to a first feeder through a second radial stub; and connecting the third dipole arm in the second dipole arm pair to the third metal layer through a third radial stub, and connecting the fourth dipole arm in the second dipole arm pair to a third feeder through a fourth radial stub. For a specific implementation, refer to the foregoing descriptions corresponding to FIG. 15 and FIG. 16.

For implementations of the radial stub and the feeder, refer to the foregoing corresponding descriptions.

In a possible design, the metasurface design method provided in at least one embodiment of this application may further include: connecting the first dipole arm to the second dipole arm through a first switch; and connecting the third dipole arm to the fourth dipole arm through a second switch. For a specific implementation, refer to the foregoing descriptions related to FIG. 17 and Table 1.

In a possible design, the metasurface design method provided in at least one embodiment of this application may further include: connecting the first dipole arm in the first dipole arm pair to the third metal layer through a first radial stub, and connecting the second dipole arm in the first dipole arm pair to the third metal layer through a second radial stub; and connecting the third dipole arm in the second dipole arm pair to a second feeder through a third radial stub, and connecting the fourth dipole arm in the second dipole arm pair to a third feeder through a fourth radial stub. For a specific implementation, refer to the description corresponding to FIG. 19.

In a possible design, the metasurface design method provided in at least one embodiment of this application may further include: connecting the first dipole arm to the third dipole arm through a third switch; connecting the first dipole arm to the fourth dipole arm through a fourth switch; connecting the second dipole arm to the third dipole arm through a fifth switch; and connecting the second dipole arm to the fourth dipole arm through a sixth switch. For a specific implementation, refer to the foregoing descriptions corresponding to FIG. 20 and Table 2.

For example, the switch includes but is not limited to at least one of the following: a DPDT switch, a PIN diode, a variable capacitance diode, an MEMS switch, and a photosensitive switch.

In a possible design, the metasurface design method provided in at least one embodiment of this application may further include: molding the switch on a side that is of the first metal layer and that is away from the first dielectric layer. For a specific implementation, refer to the foregoing descriptions corresponding to FIG. 17, FIG. 18, FIG. 19, and FIG. 20.

In a possible design, the metasurface design method provided in at least one embodiment of this application may further include: molding a third dielectric layer on a side that is of the third metal layer and that is away from the second dielectric layer; and molding the switch on a side that is of the third dielectric layer and that is away from the third metal layer. For details, refer to the foregoing description that the third dielectric layer is disposed on a side that is of the third metal layer and that is away from the second dielectric layer, and the switch is disposed on a side that is of the third dielectric layer and that is away from the third metal layer.

In a possible design, the metasurface design method provided in at least one embodiment of this application may further include: molding the first switch on a side that is of the first metal layer and that is away from the first dielectric layer; molding a third dielectric layer on a side that is of the third metal layer and that is away from the second dielectric layer; and molding the second switch on a side that is of the third dielectric layer and that is away from the third metal layer. For details, refer to FIG. 22. Details are not described herein again.

Optionally, a top view of the second metal layer and the third metal layer may be shown in FIG. 23. For details, refer to the foregoing description corresponding to FIG. 23.

It should be noted that, in embodiments of this application, materials of the dielectric layers may be completely the same or not completely the same. A molding manner in embodiments of this application may include electroplating and the like. A manner of electrical connection may include soldering connection by using a solder. A material of the solder is not limited in embodiments of this application.

In some embodiments, the solder may be made of a copper-tin alloy (Cu80Sn20).

Figure 27:
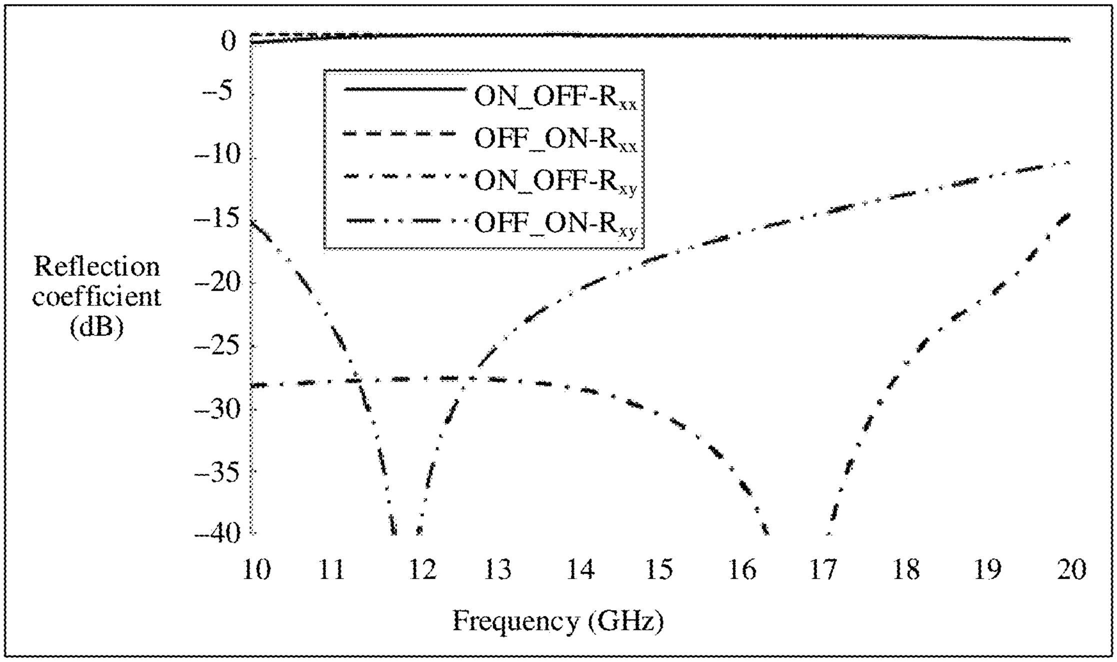
FIG. 27 is a simulation diagram of a reflection coefficient of a metasurface unit for an electromagnetic wave according to at least one embodiment of this application.
Figure 28:
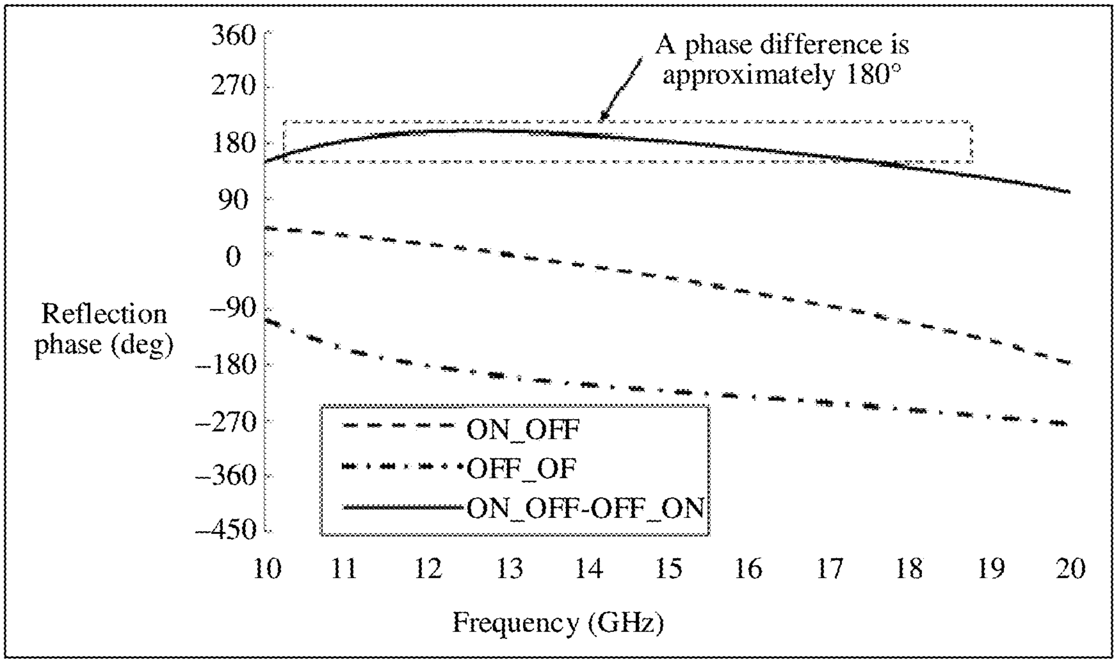
FIG. 28 is a simulation diagram of a reflection phase of a metasurface unit for an electromagnetic wave according to at least one embodiment of this application.

FIG. 27 is a simulation diagram of a reflection coefficient of a metasurface unit for an electromagnetic wave according to at least one embodiment of this application. FIG. 28 is a simulation diagram of a reflection phase of a metasurface unit for an electromagnetic wave according to at least one embodiment of this application.

According to the metasurface unit provided in embodiments of this application, numerical calculation is performed based on a periodic boundary condition, and a coding state is defined under plane wave illumination. Simulation results are shown in FIG. 27 and FIG. 28. The simulation results indicate that the metasurface unit provided in embodiments of this application implements co-polarization reflection of an electromagnetic wave in a wide band. With reference to FIG. 27, a co-polarization reflection coefficient ($R_{xx}$) is far greater than a value of a cross polarization reflection coefficient ($R_{xy}$) in two coding states, and this may be considered as co-polarization reflection. In addition, with reference to FIG. 28, a phase difference between the two states (state "0" and state "1") is close to 180°, a phase bandwidth and a phase linearity are wide, and a co-polarization reflection phase difference may maintain a stable level in a wide band.

In this way, according to the metasurface unit and the metasurface provided in embodiments of this application, an electric field polarization direction of a reflected electromagnetic wave is always consistent with an electric field direction of an incident electromagnetic wave, so that not only a wideband and a high phase linearity are met, but also co-polarization reflection is met. This is particularly applicable to a design of a wideband RIS unit.

In the description of this specification, specific features, structures, materials, or characteristics may be combined in an appropriate manner in any one or more embodiments or examples. Unless otherwise specified, for same or similar parts of the embodiments, refer to each other. In embodiments of this application and the implementations/implementation methods in the embodiments, unless otherwise specified or unless a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method based on an internal logical relationship thereof.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A metasurface unit, comprising a first metal layer, a first dielectric layer, a second metal layer, a second dielectric layer, and a third metal layer, wherein the first metal layer comprises a first dipole arm pair and a second dipole arm pair, the first dipole arm pair is disposed in a first direction, and the second dipole arm pair is disposed in a second direction perpendicular to the first direction;

the second metal layer comprises at least one of:

metal unit structures which are arranged equidistantly from each other in a third direction, metal unit structures which are arranged equidistantly from each other in a fourth direction perpendicular to the third direction, or metal unit structures which are arranged equidistantly from each other in the third direction and the fourth direction; and the third direction is parallel to the first direction or the second direction, or the third direction has a first included angle with the first direction or the second direction.

2. The metasurface unit according to claim 1, wherein the metasurface unit further comprises a first switch and a second switch, the first dipole arm pair comprises a first dipole arm and a second dipole arm, the second dipole arm pair comprises a third dipole arm and a fourth dipole arm, the first dipole arm is connected to the second dipole arm through the first switch, and the third dipole arm is connected to the fourth dipole arm through the second switch.

3. The metasurface unit according to claim 2, wherein the first switch is disposed on a side that is of the first metal layer and that is away from the first dielectric layer, the metasurface unit further comprises a third dielectric layer, the third dielectric layer is disposed on a side that is of the third metal layer and that is away from the second dielectric layer, and the second switch is disposed on a side that is of the third dielectric layer and that is away from the third metal layer.

4. The metasurface unit according to claim 1, wherein the metasurface unit further comprises a third switch, a fourth switch, a fifth switch, and a sixth switch, the first dipole arm pair comprises a first dipole arm and a second dipole arm, the second dipole arm pair comprises a third dipole arm and a fourth dipole arm, the first dipole arm is connected to the third dipole arm through the third switch, the first dipole arm is connected to the fourth dipole arm through the fourth switch, the second dipole arm is connected to the third dipole arm through the fifth switch, and the second dipole arm is connected to the fourth dipole arm through the sixth switch.

5. The metasurface unit according to claim 2, wherein the first switch and the second switch are disposed on a side that is of the first metal layer and that is away from the first dielectric layer.

6. The metasurface unit according to claim 2, wherein the metasurface unit further comprises a third dielectric layer, the third dielectric layer is disposed on a side that is of the third metal layer and that is away from the second dielectric layer, and the first switch and the second switch are disposed on a side that is of the third dielectric layer and that is away from the third metal layer.

7. The metasurface unit according to claim 1, wherein the first included angle is greater than or equal to −K° and less than or equal to +K°, and K is greater than 0 and less than 30.

8. The metasurface unit according to claim 7, wherein K is equal to 20.

9. The metasurface unit according to claim 1, wherein the first dipole arm pair comprises:

a first dipole arm connected to the third metal layer through a first radial stub, and a second dipole arm electrically connected to a first feeder or the third metal layer through a second radial stub, and the second dipole arm pair comprises:

a third dipole arm connected to the third metal layer or a second feeder through a third radial stub, and a fourth dipole arm connected to a third feeder through a fourth radial stub.

10. The metasurface unit according to claim 1, wherein the metasurface unit comprises J second metal layers, and J second dielectric layers, J is an integer greater than or equal to 2, and the J second metal layers and the J second dielectric layers are alternately arranged.

11. The metasurface unit according to claim 1, wherein a metal unit structure of the metal unit structures comprises at least one of: a grid bar structure or a fishbone structure.

12. The metasurface unit according to claim 11, wherein at least one side of a grid bar in the grid bar structure is flush with an edge of the second dielectric layer, or at least one side of a grid bar in the grid bar structure is spaced from an edge of the second dielectric layer.

13. The metasurface unit according to claim 1, wherein a dipole arm in the first dipole arm pair or the second dipole arm pair comprises at least one of: an arrow-shaped dipole arm, a strip-shaped dual-polarized dipole arm, an arc-shaped dual-polarized dipole arm, a folded dual-polarized dipole arm, or a grid-shaped dual-polarized dipole arm.

14. The metasurface unit according to claim 1, wherein the first dielectric layer is a rectangle, and the first direction is parallel to any diagonal of the rectangle.

15. The metasurface unit according to claim 1, wherein the first dielectric layer is a rectangle, and the first direction is parallel to any edge of the rectangle.

16. The metasurface unit according to claim 2, wherein the first switch or the second switch comprises at least one of: a double-pole double-throw (DPDT) switch, a positive-intrinsic-negative (PIN) diode, a variable capacitance diode, or a micro-electro-mechanical system (MEMS) switch.

17. A metasurface design method, wherein the method comprises:

forming a first metal layer on a first dielectric layer, wherein the first metal layer comprises a first dipole arm pair and a second dipole arm pair, the first dipole arm pair is disposed in a first direction, and the second dipole arm pair is disposed in a second direction perpendicular to the first direction;

forming a second metal layer on a second dielectric layer, wherein the second metal layer comprises at least one of:

metal unit structures which are arranged equidistantly from each other in a third direction, metal unit structures which are arranged equidistantly from each other in a fourth direction perpendicular to the third direction, or metal unit structures which are arranged equidistantly from each other in the third direction and the fourth direction, wherein the third direction is parallel to the first direction or the second direction, or the third direction has a first included angle with the first direction or the second direction; and forming a third metal layer on a side that is of the second dielectric layer and that is away from the second metal layer.

18. The metasurface design method according to claim 17, wherein the first dipole arm pair comprises a first dipole arm and a second dipole arm, the second dipole arm pair comprises a third dipole arm and a fourth dipole arm, and the method further comprises:

connecting the first dipole arm to the second dipole arm through a first switch; and connecting the third dipole arm to the fourth dipole arm through a second switch.

19. The metasurface design method according to claim 18, wherein the method further comprises:

forming the first switch on a side that is of the first metal layer and that is away from the first dielectric layer;

forming a third dielectric layer on a side that is of the third metal layer and that is away from the second dielectric layer; and forming the second switch on a side that is of the third dielectric layer and that is away from the third metal layer.

20. The metasurface design method according to claim 17, wherein the first dipole arm pair comprises a first dipole arm and a second dipole arm, the second dipole arm pair comprises a third dipole arm and a fourth dipole arm, and the method further comprises:

connecting the first dipole arm to the third dipole arm through a third switch;

connecting the first dipole arm to the fourth dipole arm through a fourth switch;

connecting the second dipole arm to the third dipole arm through a fifth switch; and connecting the second dipole arm to the fourth dipole arm through a sixth switch.

* * * * *